(12) United States Patent
Chung

(10) Patent No.: US 12,406,307 B2
(45) Date of Patent: Sep. 2, 2025

(54) ELECTRONIC DEVICE AND METHOD FOR MANAGING PERSONAL RESOURCE

(71) Applicant: Trinion America, Inc., San Diego, CA (US)

(72) Inventor: Moon Sun Chung, Seoul (KR)

(73) Assignee: Trinion America, Inc., San Diego, CA (US)

( * ) Notice: Subject to any disclaimer, the term of this patent is extended or adjusted under 35 U.S.C. 154(b) by 169 days.

(21) Appl. No.: 18/330,195

(22) Filed: Jun. 6, 2023

(65) Prior Publication Data
US 2024/0005407 A1    Jan. 4, 2024

(30) Foreign Application Priority Data

Jun. 29, 2022   (KR) .................. 10-2022-0079866

(51) Int. Cl.
*G06F 3/04842*   (2022.01)
*G06F 3/04817*   (2022.01)
*G06Q 40/06*     (2012.01)

(52) U.S. Cl.
CPC ......... *G06Q 40/06* (2013.01); *G06F 3/04817* (2013.01); *G06F 3/04842* (2013.01)

(58) Field of Classification Search
CPC ................................................. G06F 3/048–05
See application file for complete search history.

(56) References Cited

U.S. PATENT DOCUMENTS

| | | | | |
|---|---|---|---|---|
| 5,873,108 A | * | 2/1999 | Goyal | G06F 3/04886 715/764 |
| 7,293,072 B2 | * | 11/2007 | Blegen | G06Q 20/108 715/825 |
| 7,975,239 B2 | * | 7/2011 | Bellotti | G06Q 10/06 715/767 |

(Continued)

FOREIGN PATENT DOCUMENTS

| | | |
|---|---|---|
| KR | 10-1949447 B1 | 2/2019 |
| KR | 10-2084167 B1 | 2/2020 |
| KR | 10-2020-0047139 A | 5/2020 |

OTHER PUBLICATIONS

Office Action received in Korean Application No. 10-2022-0079866 dated Dec. 6, 2023.

*Primary Examiner* — Daniel Rodriguez
(74) *Attorney, Agent, or Firm* — Knobbe, Martens, Olson & Bear, LLP

(57) ABSTRACT

According to various embodiment of the present disclosure, there is provided a technique that includes a display; a storage; and a processor, wherein the processor is configured to: display a home screen; display a schedule management screen comprising the information about a plurality of schedules of the user, in response to a first user input for selecting a schedule management icon; display a connections management screen comprising the information about a plurality of contacts, in response to a second user input for selecting a connections management icon; display an asset management screen comprising asset information of the user on the display, in response to a third user input for selecting (Continued)

an asset management icon; and display a report management screen comprising information about a usage log of the application during a preset period, in response to a fourth user input for selecting a report management icon.

17 Claims, 44 Drawing Sheets

(56) References Cited

U.S. PATENT DOCUMENTS

| | | | | |
|---|---|---|---|---|
| 2002/0097277 A1* | 7/2002 | Pitroda | ................. | G06Q 10/10 715/854 |
| 2004/0225695 A1* | 11/2004 | Womack | ............. | G06F 3/04883 |
| 2008/0028317 A1* | 1/2008 | Castelli | ................ | G06Q 10/109 715/744 |
| 2009/0187531 A1* | 7/2009 | Singh | ..................... | G06Q 10/10 715/764 |
| 2010/0269049 A1* | 10/2010 | Fearon | ................. | G06Q 10/109 715/752 |
| 2011/0126123 A1* | 5/2011 | Reter | ................... | G06F 15/0266 715/769 |
| 2011/0145761 A1* | 6/2011 | Krief | ................... | G06Q 10/109 715/810 |
| 2011/0313805 A1* | 12/2011 | Heydemann | ..... | G06Q 10/06316 705/7.14 |
| 2012/0036441 A1* | 2/2012 | Basir | ...................... | H04L 67/04 715/734 |
| 2012/0198347 A1* | 8/2012 | Hirvonen | ............ | G06F 16/9038 715/738 |
| 2012/0311451 A1* | 12/2012 | Beaven | ................... | H04L 65/40 715/736 |
| 2013/0006868 A1* | 1/2013 | Hawkes | ................ | G06Q 40/08 705/306 |
| 2013/0067343 A1* | 3/2013 | Groves | ................... | H04L 67/54 715/739 |
| 2014/0282016 A1* | 9/2014 | Hosier, Jr. | ............... | G06F 3/017 715/733 |
| 2016/0014059 A1* | 1/2016 | Rathod | ............ | H04M 1/72484 715/752 |
| 2016/0092094 A1* | 3/2016 | Topping | ................ | G06Q 10/10 715/765 |
| 2016/0180298 A1* | 6/2016 | McClement | ........ | G06F 3/04842 705/7.21 |
| 2017/0085520 A1* | 3/2017 | Umapathy | .......... | G06Q 10/1097 |
| 2017/0201850 A1* | 7/2017 | Raleigh | .................... | H04W 4/50 |
| 2017/0344923 A1* | 11/2017 | Pike | ...................... | G06Q 10/10 |
| 2018/0129993 A1* | 5/2018 | Fowler | .................... | G06F 21/31 |
| 2022/0083178 A1* | 3/2022 | Arama | ................ | G06F 3/04817 |
| 2022/0237700 A1* | 7/2022 | Sreenivasan | .......... | G06F 3/0488 |
| 2022/0383268 A1* | 12/2022 | Chen | ................. | G06Q 10/0633 |
| 2023/0298017 A1* | 9/2023 | Joao | ..................... | G06Q 50/163 705/26.62 |
| 2023/0351282 A1* | 11/2023 | Uren | ................. | G06Q 10/06312 |

* cited by examiner

Curious about lifestyle
Please enter marital status

Is there a partner with whom you share life and collect assets?

233
- ☑ Single
- ☐ Married
- ☐ Others

Previous | Next 235      231

FIG. 2E

What type?

When drawing up a schedule, do you plan or improvise the schedule?

[✓] Planned
Type of person who plans a schedule in advance by hour, day, month, and year and executes the schedule (there is calendar mainly used)

[ ] Improvisatory
Type of person who executes a schedule in an improvisatory manner according to circumstances than planning the schedule (there is no calendar mainly used)

Do you like to meet someone?
Do you like being alone?

[✓] Extroverted
Extrovert who often meets friends and acquaintances and spends much money on fashion

[ ] Introverted
Introvert who usually has meeting with family and prefer to be alone Stable asset management or aggressive asset management?

[✓] Stable
Disposition to save most of assets and be passive in investment

[ ] Aggressive
Disposition to invest more than 60% of assets or spend more than half of income

[Previous] [Start]

365 — Score — View all >
- Evaluation
- October 10 ★ 4/5
- October 11 ★ 4/5
- October 12 ★ 4/5

366 — My disposition

PEA
Extroverted in relationships, planned in time management, and aggressive in property management Similar disposition 367 — Main conducts — View all ⌄

English conversation for one hour
08:00 am - 09:00 am / English Academy
+7  ★ 5/5

Every Friday evening meeting
Fri / 07:00 pm – 09:00 pm
+7  ★ 5/5

Mainly participating connections

FIG. 9B

Fixed cost

| Insurance fee | 100,000 won |
| Communication cost | 50,000 won |
| Real estate purchase fund | 8,300,000 won |
| Rent (monthly rent, management fee) | 700,000 won |

\+ Add

Variable cost

| Food expenses | 200,000 won |
| Tax | 100,000 won |
| Congratulation and condolence expenses | 0 won |
| Shopping | 100,000 won |
| Others | 200,000 won |

\+ Add 900
920

FIG. 10B

Expenditure — 1000

Insurance fee   Plan          Performance
               100,000 won    100,000 won

Communication cost
               50,000 won     50,000 won

Real estate purchase fund
               8,300,000 won  8,300,000 won

1020

Rent
               700,000 won    700,000 won

Food expenses
               200,000 won    200,000 won

Tax
               100,000 won    100,000 won

Congratulation and condolence expenses
               0 won          300,000 won

Shopping

ELECTRONIC DEVICE AND METHOD FOR MANAGING PERSONAL RESOURCE

CROSS-REFERENCE TO RELATED APPLICATION

This application is based upon and claims the benefit of priority from Korean Patent Application No. 10-2022-0079866, filed on Jun. 29, 2022, the entire contents of which are incorporated herein by reference.

TECHNICAL FIELD

The present disclosure relates to an electronic device and a method for managing a personal resource.

BACKGROUND

With diversification of functions of an electronic device, the electronic device is being implemented in the form of a multimedia player having complex functions such as capturing still or moving images, playback of music or video files, games, broadcast reception, or a call function. For example, a user may be provided with various types of services by using applications installed in an electronic device. Such an electronic device may include a display, and may display screens related to functions on the display.

Today, humans can manage various personal resources (e.g., time, personal connections, or assets) through IT infrastructure, and it has become important to efficiently manage finite personal resources. Recently, with the development of smart devices, various applications for managing personal resources have been released.

SUMMARY

When various personal resources are individually managed through different applications, it may be inconvenient and difficult for a user to combine and manage the personal resources. For example, when a contact application is used to manage personal connections among various personal resources, in general, only one-dimensional information such as counterparts' names and phone numbers may be stored and managed, and when a schedule management application is used to manage a schedule, in general, only one-dimensional information such as schedule time and schedule contents may be stored and managed.

According to various embodiments of the present disclosure, there is provided a technique that includes a display; a storage configured to store personal information of a user, information about a plurality of schedules of the user, information about a plurality of contacts, and asset information of the user; and a processor, wherein the processor is configured to: display, on the display, a home screen of an application for personal resource management; display a schedule management screen comprising the information about the plurality of schedules of the user on the display, in response to a first user input for selecting a schedule management icon on the home screen; display a connections management screen comprising the information about the plurality of contacts on the display, in response to a second user input for selecting a connections management icon on the home screen; display an asset management screen comprising the asset information of the user on the display, in response to a third user input for selecting an asset management icon on the home screen; and display a report management screen comprising information about a usage log of the application during a preset period on the display, in response to a fourth user input for selecting a report management icon on the home screen.

The processor is configured to: generate, based on the information about the plurality of schedules, a time status bar indicating a degree to which the user uses time; generate, based on the information about the plurality of contacts, a connections status bar indicating a degree to which the user uses connections; generate, based on the asset information of the user, an asset status bar indicating a degree to which the user uses assets; and display the time status bar, the connections status bar, and the asset status bar in one area of the home screen.

The schedule management screen comprises information about at least one schedule that has been completed among the information about the plurality of schedules.

The processor is configured to display, in response to a fifth user input for selecting information about one schedule from the information about the plurality of schedules of the user included in the schedule management screen, a detailed schedule screen comprising details information, income and expenditure information, and photo and music information registered with respect to the selected information on the display.

The processor is configured to display a conduct generation screen for generating new conduct information on the display, in response to a sixth user input for selecting a conduct addition icon included in the schedule management screen, and wherein the conduct information comprises schedule information, place information, asset information, and rating information.

The processor is configured to: receive a seventh user input for selecting one contact from among the plurality of contacts included in the connections management screen; and display profile information, call log information, and conduct information related to the selected contact on the display, in response to the seventh user input, and wherein the conduct information related to the selected contact comprises a conduct name, schedule information, place information, asset information, and rating information, which are related to the selected contact.

The asset information of the user is classified into a financial asset, a real estate asset, a physical asset, a non-physical asset, a cherished item, income details, and expenditure details, and wherein the processor is configured to display each piece of the classified asset information of the user in different areas of the asset management screen.

The processor is configured to: generate a monthly profit and loss statement based on the asset information of the user; and display the generated monthly profit and loss statement in one area of the asset management screen, based on an eighth input for selecting a profit and loss statement tab included in the asset management screen.

The processor is configured to: generate a monthly statement of financial position, based on the asset information of the user; and display the generated monthly statement of financial position in one area of the asset management screen, in response to a ninth user input for selecting a financial position statement tab included in the asset management screen.

According to various embodiment of present disclosure, there is provided a technique that includes: displaying, on a display, a home screen of an application for personal resource management; displaying a schedule management screen comprising information about a plurality of schedules of a user stored in a storage on the display, in response to a first user input for selecting a schedule management icon on the home screen; displaying a connections management screen comprising information about a plurality of contacts stored in the storage on the display, in response to a second user input for selecting a connections management icon on the home screen; displaying an asset management screen comprising asset information of the user stored in the storage on the display, in response to a third user input for selecting an asset management icon on the home screen; and displaying a report management screen comprising information about a usage log of the application during a preset period on the display, in response to a fourth user input for selecting a report management icon on the home screen.

The method further includes: generating, based on the information about the plurality of schedules, a time status bar indicating a degree to which the user uses time; generating, based on the information about the plurality of contacts, a connections status bar indicating a degree to which the user uses connections; generating, based on the asset information of the user, an asset status bar indicating a degree to which the user uses assets; and displaying the time status bar, the connections status bar, and the asset status bar in one area of the home screen.

The schedule management screen comprises information about at least one schedule that has been completed among the information about the plurality of schedules.

The method further includes: displaying, in response to a fifth user input for selecting information about one schedule from the information about the plurality of schedules of the user included in the schedule management screen, a detailed schedule screen comprising details information, income and expenditure information, and photo and music information registered with respect to the selected information on the display after the displaying of the schedule management screen on the display.

The method further includes: displaying, after the displaying of the schedule management screen on the display, a conduct generation screen for generating new conduct information on the display, in response to a sixth user input for selecting a conduct addition icon included in the schedule management screen, and wherein the conduct information comprises schedule information, place information, asset information, and rating information.

The method further includes: after the displaying of the connections management screen on the display, receiving a seventh user input for selecting one contact from among the plurality of contacts included in the connections management screen; and displaying profile information, call log information, and conduct information related to the selected contact on the display, in response to the seventh user input, wherein the conduct information related to the selected contact comprises a conduct name, schedule information, place information, asset information, and rating information, which are related to the selected contact.

The asset information of the user is classified into a financial asset, a real estate asset, a physical asset, a non-physical asset, a cherished item, income details, and expenditure details, and wherein the displaying of the asset management screen includes displaying each piece of the classified asset information of the user in different areas of the asset management screen.

The method further includes: generating a monthly profit and loss statement based on the asset information of the user; and displaying the generated monthly profit and loss statement in one area of the asset management screen, based on an eighth input for selecting a profit and loss statement tab included in the asset management screen.

The method further includes: generating a monthly statement of financial position, based on the asset information of the user; and displaying the generated monthly statement of financial position in one area of the asset management screen, in response to a ninth user input for selecting a financial position statement tab included in the asset management screen.

According to various embodiment of the present disclosure, a non-transitory computer-readable recording medium recording a program to be performed on a computer, wherein the program comprises executable commands which, when executed by a processor, cause the processor to: display, on the display, a home screen of an application for personal resource management; display a schedule management screen comprising information about plurality of schedules of a user stored in a storage on the display, in response to a first user input for selecting a schedule management icon on the home screen; display a connections management screen comprising information about plurality of contacts stored in the storage on the display, in response to a second user input for selecting a connections management icon on the home screen; display an asset management screen comprising asset information of the user stored in the storage on the display, in response to a third user input for selecting an asset management icon on the home screen; and display a report management screen comprising information about a usage log of the application during a preset period on the display, in response to a fourth user input for selecting a report management icon on the home screen.

BRIEF DESCRIPTION OF DRAWINGS

The accompanying drawings, which are incorporated in and constitute a part of the specification, illustrate embodiments of the present disclosure.

FIGS. 2A, 2B, 2C, 2D, and 2E illustrate an execution screen and a sign-up screen of an application according to various embodiments of the present disclosure.

FIGS. 3D, 3E, and 3F illustrate a profile screen of an application according to various embodiments of the present disclosure.

FIGS. 9A and 9B illustrate a business plan screen among asset management screens according to various embodiments of the present disclosure.

FIGS. 10A, 10B, and 10C illustrate a profit and loss statement screen among asset management screens according to various embodiments of the present disclosure.

DETAILED DESCRIPTION

Figure 1:
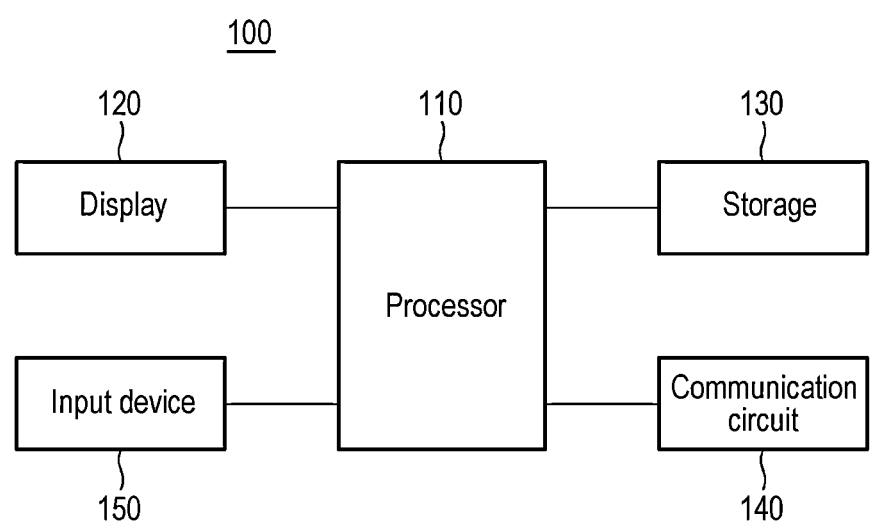
FIG. 1 is a block diagram of an electronic device according to various embodiments of the present disclosure.

Embodiments of the present disclosure are illustrated for describing the technical spirit of the present disclosure. The scope of the claims according to the present disclosure is not limited to the embodiments described below or to the detailed descriptions of these embodiments.

All technical or scientific terms used herein have meanings that are generally understood by a person having ordinary knowledge in the art to which the present disclosure pertains, unless otherwise specified. The terms used herein are selected for only more clear illustration of the present disclosure, and are not intended to limit the scope of claims in accordance with the present disclosure.

The expressions "include", "provided with", "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims.

The terms "first", "second", etc. used herein are used to identify a plurality of components from one another, and are not intended to limit the order or importance of the relevant components.

The term "unit" used in these embodiments means a software component or hardware component, such as a field-programmable gate array (FPGA) and an application specific integrated circuit (ASIC). However, a "unit" is not limited to software and hardware and it may be configured to be an addressable storage medium or may be configured to run on one or more processors. For example, a "unit" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables. Functions provided in components and "unit" may be combined into a smaller number of components and "units" or further subdivided into additional components and "units."

The expression "based on" used herein is used to describe one or more factors that influences a decision, an action of judgment or an operation described in a phrase or sentence including the relevant expression, and this expression does not exclude additional factor influencing the decision, the action of judgment or the operation.

When a certain component is described as "coupled to" or "connected to" another component, this should be understood as having meaning that the certain component may be coupled or connected directly to the other component or that the certain component may be coupled or connected to the other component via a new intervening component.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Although process steps, method steps, algorithms, and the like have been described in a successive order with regard to the flowcharts illustrated in the present disclosure, such processes, methods, and algorithms may be configured to operate in any appropriate order. In other words, steps of processes, methods, and algorithms described in various embodiments of the present disclosure are not necessarily performed in the order described in the present disclosure. In addition, some steps may be described as being performed asynchronously, such steps may be performed synchronously in other embodiments. In addition, an example of a process by illustration in the drawings does not mean that the exemplified processes exclude other changes and modifications related thereto, does not mean that the exemplified process or any of its steps is essential to one or more of various embodiments of the present disclosure, and does not mean that the exemplified process is preferable.

FIG. 1 is a block diagram of an electronic device 100 according to various embodiments of the present disclosure.

Referring to FIG. 1, the electronic device 100 according to various embodiments may include a processor 110, a display 120, a storage 130, a communication circuit 140, and an input device 150. Omitting or replacing some of the elements illustrated in FIG. 1 will not interfere with implementing the various embodiments disclosed in this document.

According to various embodiments, the processor 110 of the electronic device 100 may be an element capable of controlling the elements of the electronic device 100 and/or performing data processing or calculation related to communication. The processor 110, for example, may be operatively connected to the elements of the electronic device 100. The processor 110 may load commands or data received from other components of the electronic device 100 into a memory (not shown), may process the commands or data stored in the memory, and may store result data.

The display 120 according to various embodiments may display various screens, based on control of the processor 110. The display 120 may be implemented in the form of a touch sensor panel (TSP) capable of recognizing touch or approach (e.g., hovering) of various external objects. For example, the display 120 may include a capacitive sensor to recognize touch or approach of the various external objects. The capacitive sensor may include a plurality of capacitors, and the capacitive sensor may apply an electrical signal to the capacitors. The capacitors may charge and discharge electric charges in response to the application of the electrical signal. When the electrical signal is applied to the capacitors, the capacitors may be charged according to the magnitude of voltage of the electrical signal. The display 120 may receive a user's touch input, based on a signal collected by the capacitive sensor.

The input device 150 according to various embodiments may receive a command or data to be used by an element (e.g., the processor 110) of the electronic device 100 from outside (e.g., the user) of the electronic device 100. The input device 150 may include, for example, a microphone, a mouse, a keyboard, or a digital pen. According to various embodiments, the input device 150 may be implemented as an element separate from the display 120, or may be implemented as a single element with the display 120. For example, the input device 150 may be implemented as a touch sensor panel of the display 120. The input device 150 may be implemented in various forms in which a user input can be received, but is not limited to the above examples.

The storage 130 according to various embodiments may store various pieces of data used by at least one element of the electronic device 100. For example, the storage 130 may store a plurality of contacts. For example, the storage 130 may store various pieces of information (e.g., personal information, schedule information, contact record information, income and expenditure information) corresponding to the plurality of contacts.

The communication circuit 140 of the electronic device 100 according to various embodiments may establish a communication channel with an external device, and may transmit or receive various pieces of data to or from the external device. According to various embodiments, the communication circuit 140 may include a cellular communication module so as to be connected to a cellular network (e.g., 3G, LTE, 5G, WiBro, or WiMax). According to various embodiments, the communication circuit 140 may include a short-range communication module to transmit or receive data to or from the external device by using short-range communication (e.g., Wi-Fi, Bluetooth, Bluetooth low energy (BLE), or UWB), but the present disclosure is not limited thereto.

FIGS. 2A, 2B, 2C, 2D, and 2E illustrate an execution screen and a sign-up screen of an application according to various embodiments of the present disclosure.

Figure 2A:
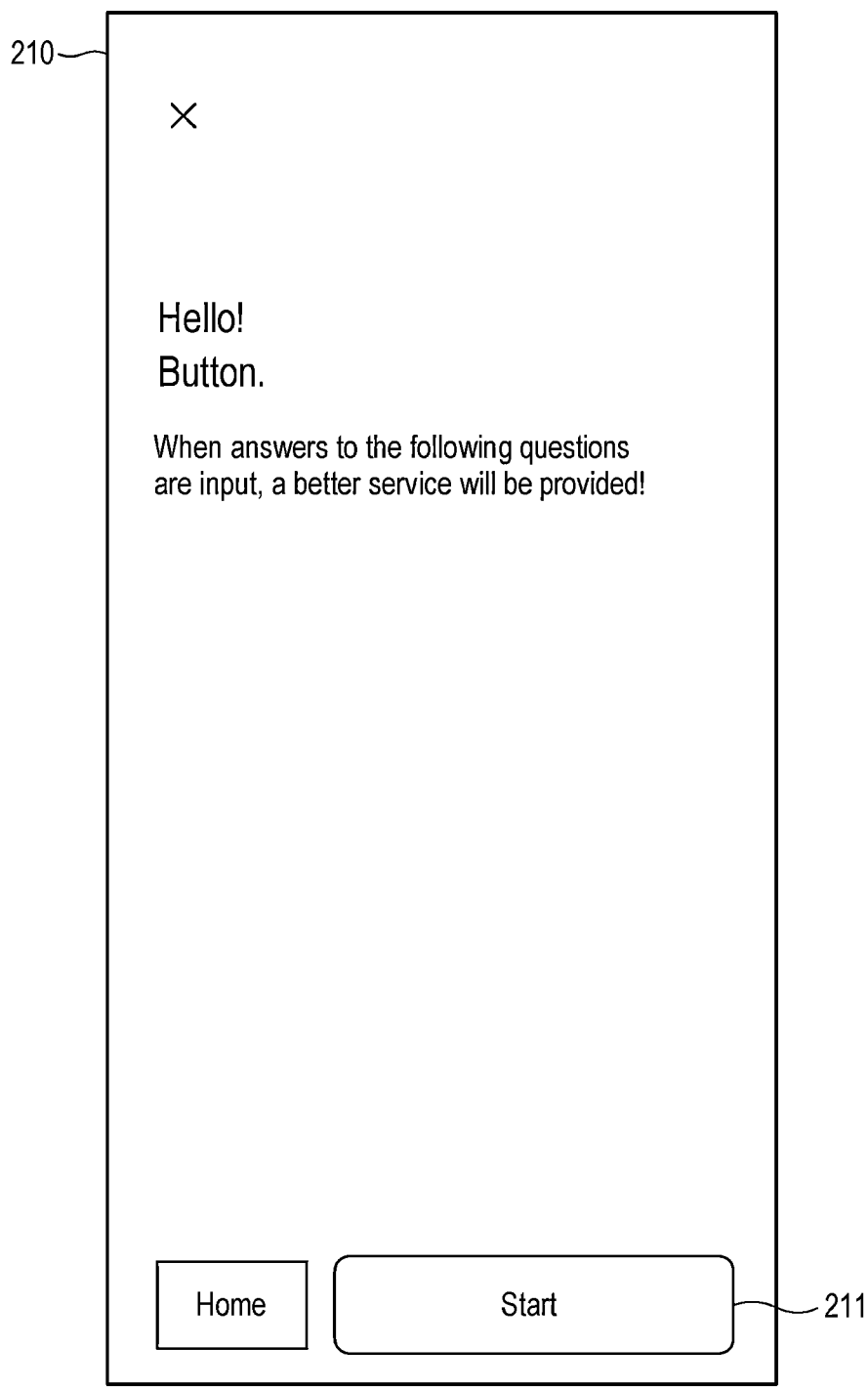
Figure 2B:
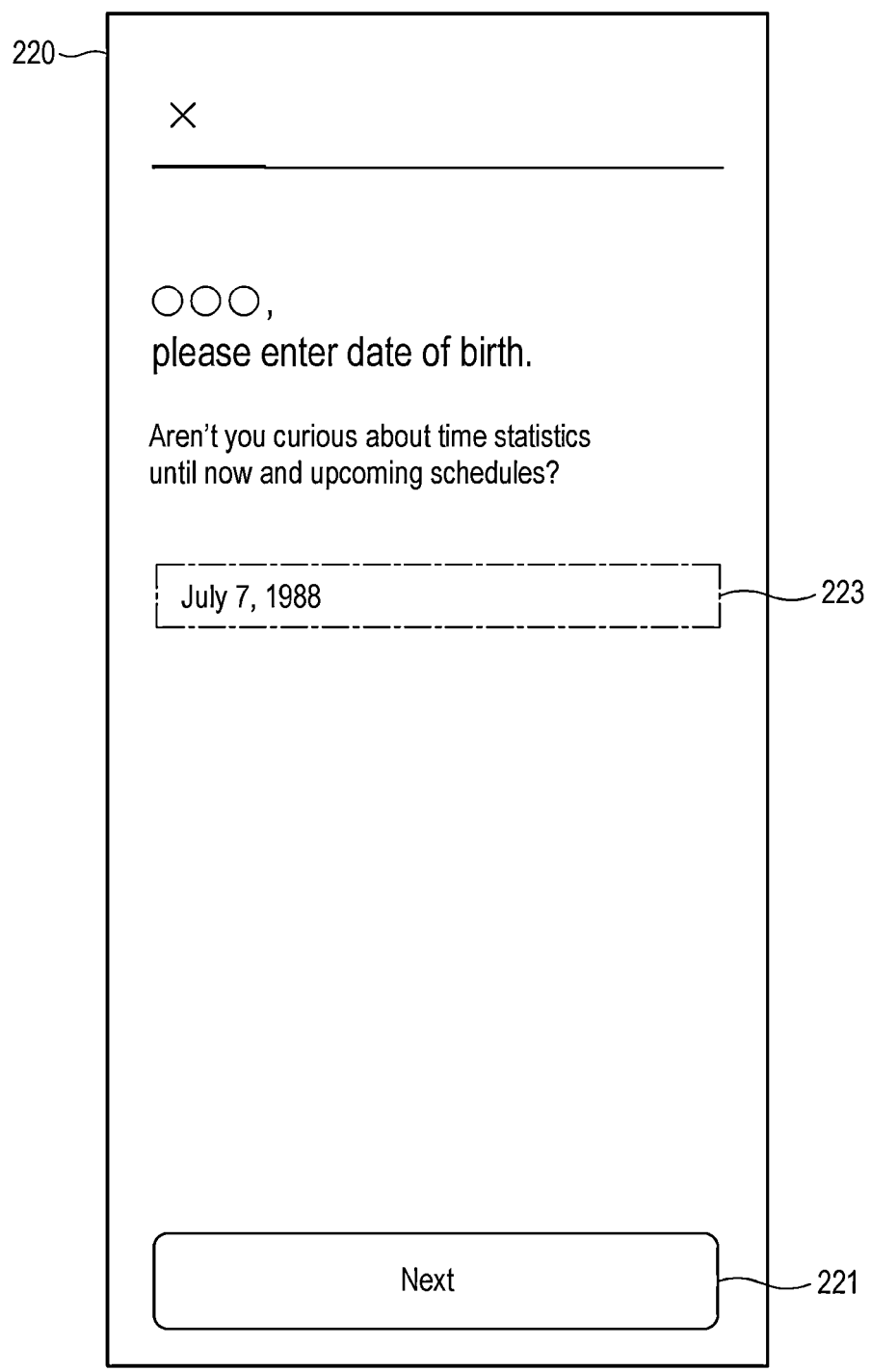

Referring to FIGS. 2A and 2B, the processor 110 according to various embodiments of the present disclosure may execute an application for personal resource planning "Button" shown in FIG. 2A may be an application name. The processor 110 may display, through the display 120, various execution screens of the application for personal resource planning. When the application for personal resource planning is first executed, the processor 110 may display an initial screen 210 on the display 120. When a user's input for selecting a start icon 211 included in the initial screen 210 is received, the processor 110 may display a personal information input screen 220 for inputting personal information of the user. For example, the user may input the user's birthdate into a birthdate input window 223 included in the personal information input screen 220, and may select a "next" icon 221. In this case, the processor 110 may store the input birthdate of the user in the storage 130.

Figure 2D:
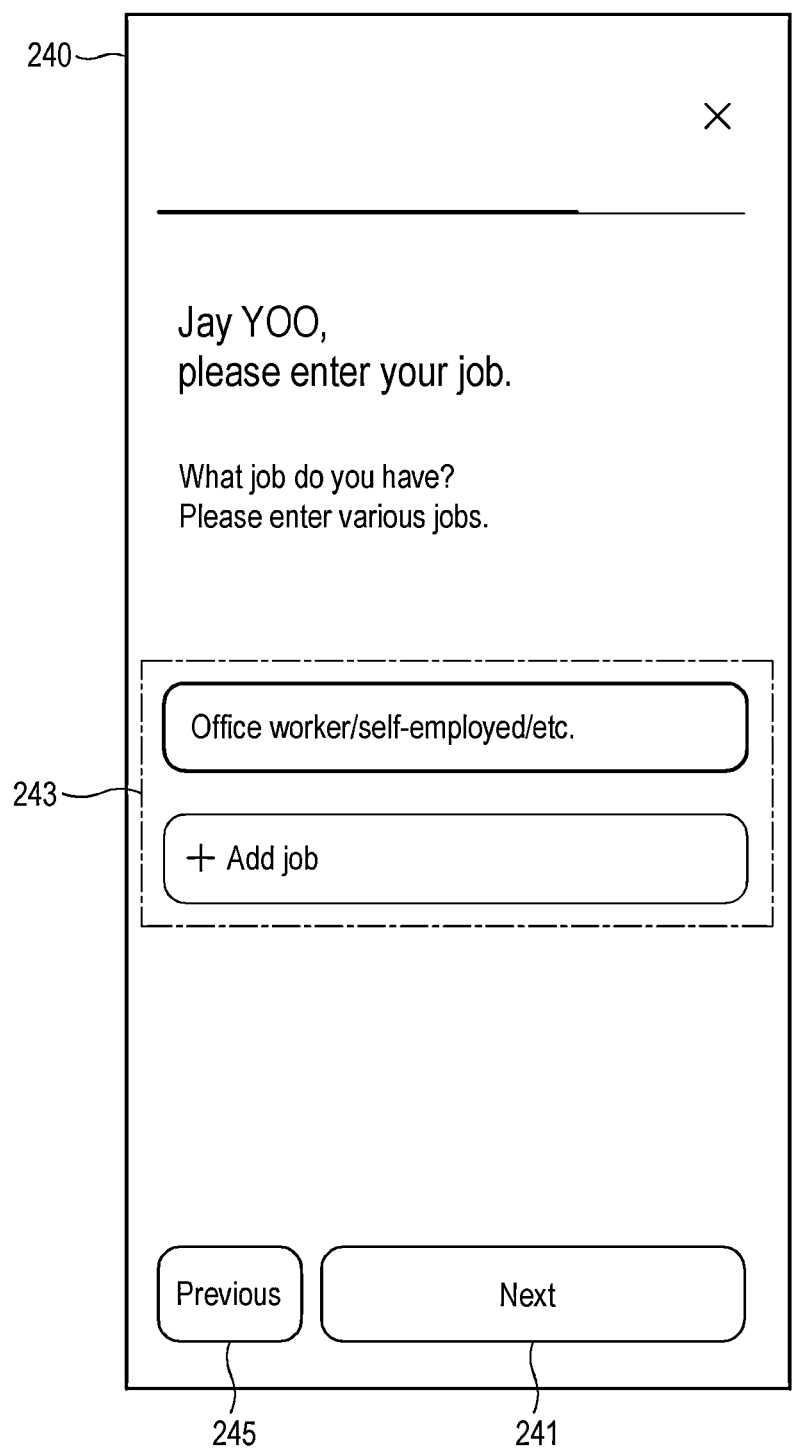

As illustrated in FIG. 2C, the user may input personal information regarding marital status through a selection area 233 of a personal information input screen 230. For example, the user may select one from among single or married. After completion of the input, the user may select a "next" icon 231. The input information regarding marital status may be stored in the storage 130. Also, the user may select a "previous" icon 235 to return to the previous page. When the "next" icon 231 is selected, the user may input, as illustrated in FIG. 2D, personal information about a job through an input area 243 of a personal information input screen 240. For example, the user may be input as an office worker. After completing the input, the user may select a "next" icon 241. The input personal information about a job may be stored in the storage 130. The user may select a "previous" icon 245 to return to the previous page. When the "next" icon 241 is selected, a personal information input screen 250 may be displayed as illustrated in FIG. 2E. The user may select a personality type and an asset management type through a questionnaire area 253 of the personal information input screen 250. After completing the input, the user may select a start icon 251. The input content may be stored in the storage 130. In order to return to the previous page, a "previous" icon 255 may be selected. In addition, the user may input various pieces of personal information of the user (e.g., the user's address, phone number, e-mail address, business hours, schedule information, birthdate of a family member). Through the above-described process, the user may select the start icon 251 when personal information is input.

Figure 3A:
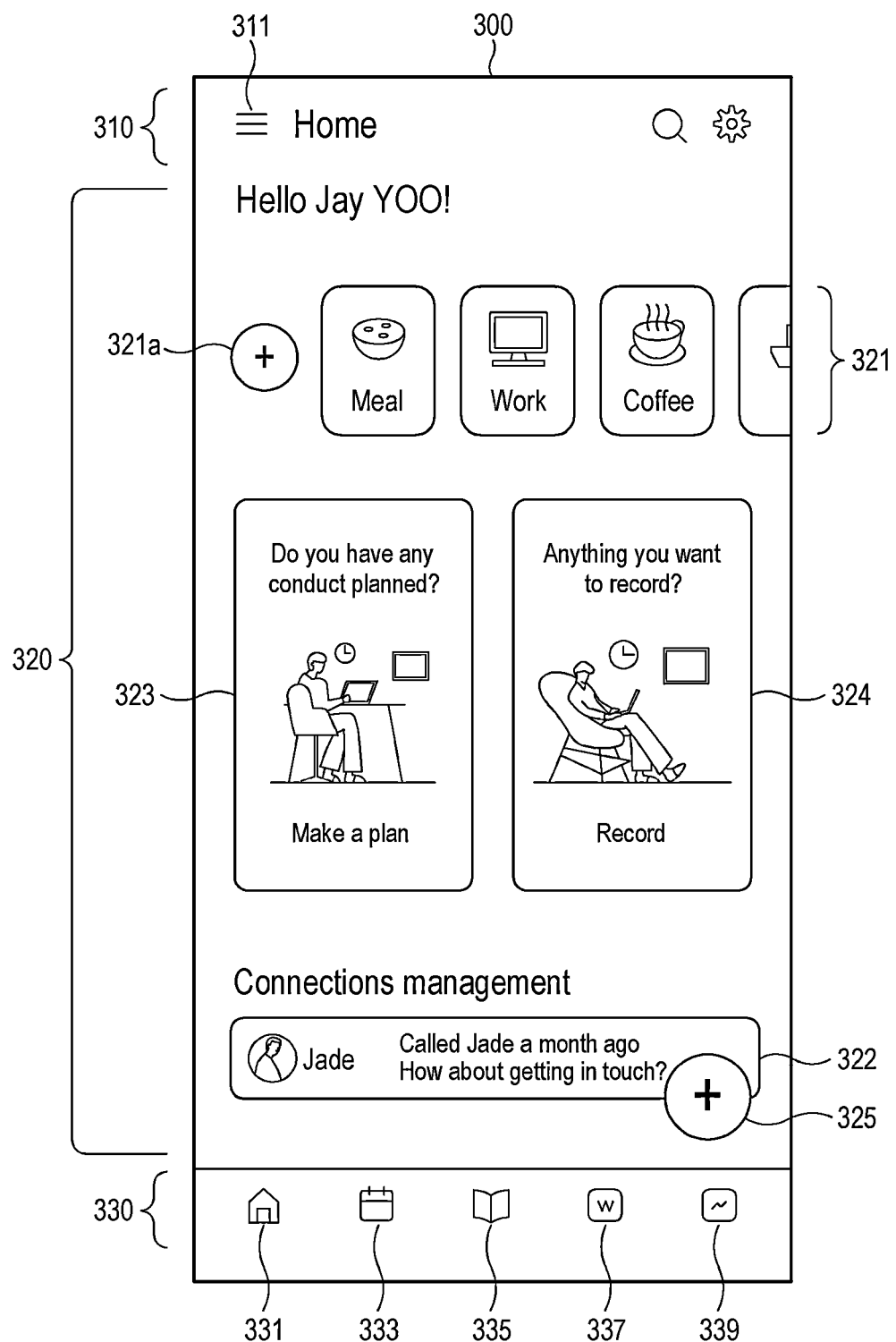
FIG. 3A illustrates a home screen of an application according to various embodiments of the present disclosure.

FIG. 3A illustrates a home screen 300 of an application according to various embodiments of the present disclosure.

Referring to FIG. 3A, the processor 110 according to various embodiments may display the home screen of the application after input of the user's personal information is completed. Alternatively, when the application is executed, the processor 110 may display the home screen 300. The home screen 300 may include, for example, a setting area 310, an information display area 320, and a function selection area 330.

The processor 110 according to various embodiments may display, in the function selection area 330, a home screen icon 331, a schedule management icon 333, a connections management icon 335, an asset management icon 337, and a report management icon 339. The processor 110 may display the home screen 300 of the application when a user input for selecting the home screen icon 331 is received.

The processor 110 according to various embodiments may display, in the setting area 310, a list icon 311 for displaying a list of functions provided by the application. When a user input for selecting the list icon 311 is received, the processor 110 may display the list of functions provided by the application.

The processor 110 according to various embodiments may display various pieces of information based on the personal information of the user inputted in the information display area 320. The processor 110 may display, in the information display area 320, an icon 325 for generating various types of conducts (or conduct information). The conduct disclosed herein may imply information about various schedules or activities. For example, the conduct may include information about daily activities, information about business activities, and information about meeting activities. The conduct may include the name of a planned conduct, schedule information, location information, asset information, and rating information. Planned schedule information may include information about the planned time required and participant, planned asset information may imply planned income or expenditure, and planned rating information may be a score for evaluating the corresponding conduct. For example, the conduct is information about a schedule or activity of at least one among daily life, meal, coffee, meditation, walk, jogging, golf, horseback riding, surfing, work, presentation, meeting, class, research, cooking, repair, study, painting, and bicycling.

The processor 110 may display, in the information display area 320, a plurality of shortcut icons for generating a new conduct. The processor 110 may display, in a shortcut icon area 321, the plurality of shortcut icons for generating a new conduct. For example, the processor 110 may display, in the shortcut icon area 321, an icon for generating a conduct related to a meal and an icon for generating a conduct related to work. The processor 110 may display a conduct, which is frequently performed in a current time zone, in the shortcut icon area 321. The processor 110 may display, in the shortcut icon area 321, a quick conduct addition icon (shortcut) 321a for quickly adding a new conduct. When the user selects the quick conduct addition icon 321a, the user may move to a conduct selection screen to quickly generate a conduct. A description thereof will be made in detail with reference to FIGS. 3B and 3C.

According to various embodiments, the type of conduct information may be a planned conduct or a performance conduct. The planned conduct may imply a conduct planned to be performed in the future. For example, the planned conduct may include an activity planned to be performed on a specific day, a schedule planned to be performed with a specific person, and an activity planned to be performed at a specific period. The performance conduct may imply a conduct that has already been performed. For example, the performance conduct is a past conduct, and may include actual performance details of the corresponding conduct. For example, the performance conduct may be additionally generated by inputting whether the planned conduct is performed, a rating, and an actual performance content.

The processor 110 may display, in the information display area 320, an icon 323 for generating a planned conduct and a record icon 324 for making a record about a past conduct. The processor 110 may further display the generated planned conduct in the information display area 320. For example, a planned conduct, which includes information indicating that a weekly meeting is scheduled to be held in a café from 10 am to 1:30 pm on September 30, may be displayed in the information display area 320.

The processor 110 may display the contents of the past conduct in the information display area 320. For example, the processor 110 may display, in the information display area 320, the contents of a past conduct related to travel expense report preparation that is scheduled to be made by 4 pm today.

The processor 110 may display information about connections in the information display area 320. The processor 110 may display connections management information 322 in the information display area 320, based on the plurality of contacts and a communication goal for each of the plurality of contacts. For example, the processor 110 may display information about a specific contact for which a communication goal has not been achieved in the information display area 320. For example, the processor 110 may display the text "You called OOO a month ago. How about making a call?" in the information display area 320.

The processor 110 may further display information about connections who have joined a specific group (or meeting), among the information about connections, in the information display area 320. For example, the processor 110 may display information about connections who have joined a reading group in the information display area 320, together with the phrase "Contact people who have joined the reading group once a week".

The processor 110 may further display the conduct addition icon 325 for generating a new conduct. The user may select the conduct addition icon 325 to generate and add a new conduct.

Figure 3B:
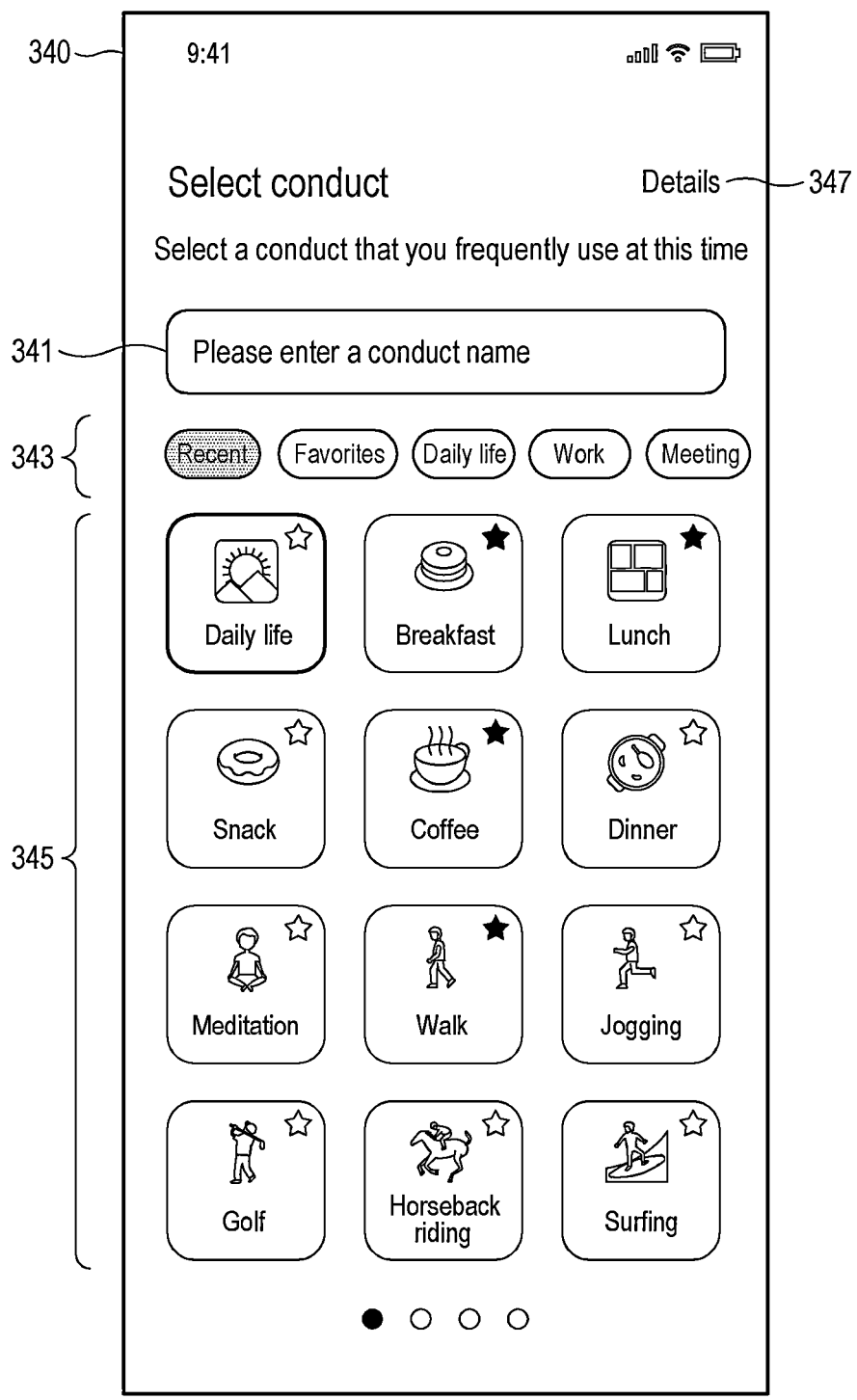
FIGS. 3B and 3C illustrate conduct selection screens of an application according to various embodiments of the present disclosure.
Figure 3C:
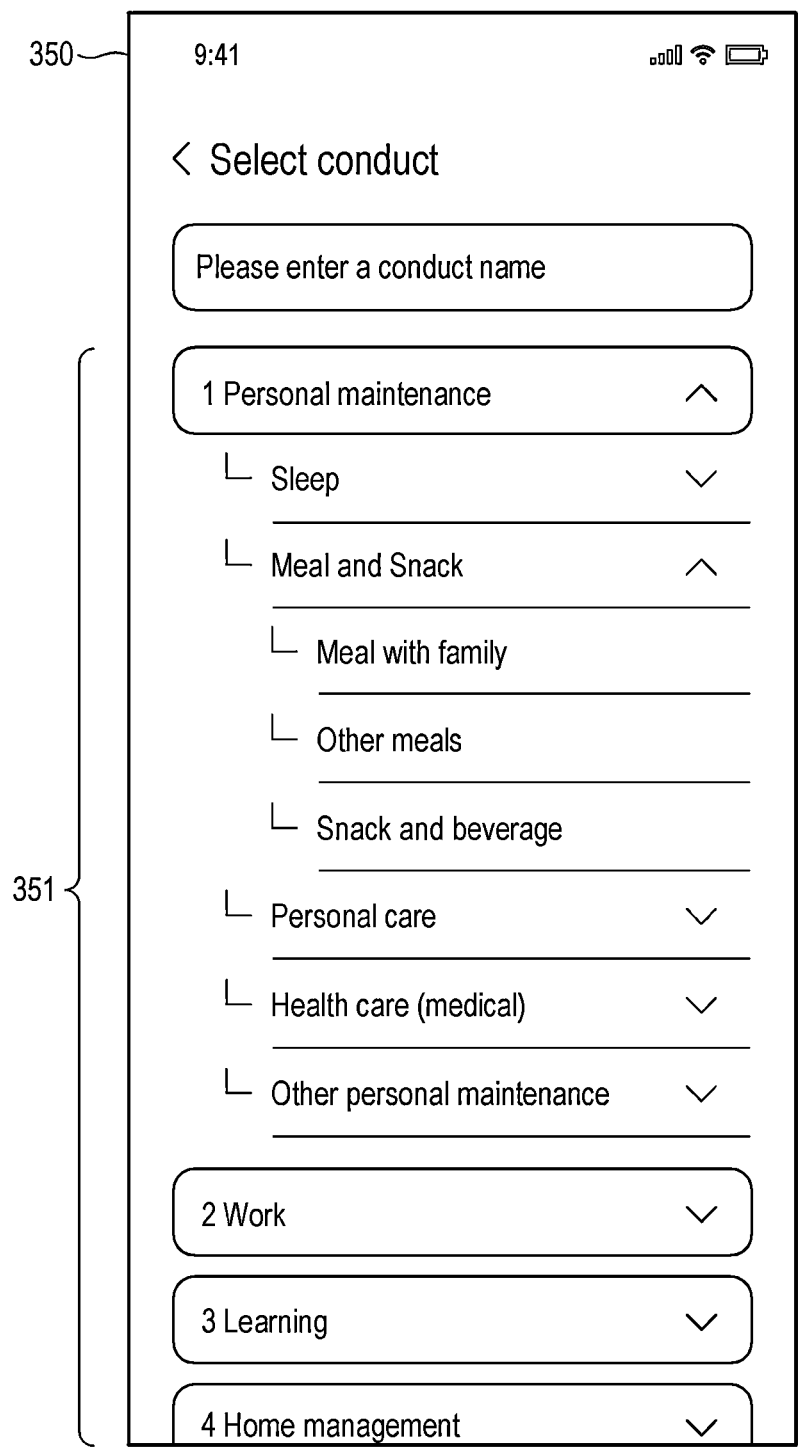

FIGS. 3B and 3C illustrate conduct selection screens of an application according to various embodiments of the present disclosure. When the user selects the quick conduct addition icon 321a illustrated in FIG. 3A, the user may move to a conduct selection screen 340 to quickly generate a conduct. The user may select the type of a new conduct to be generated from among a plurality of types of conducts.

According to an embodiment, the user may input the name of the new conduct, which is to be generated, in a conduct name input area 341 to search for and select the type of the new conduct to be generated. In this case, the processor 11 may display the type of conduct that has been found in a conduct type selection area 345 below. For example, the user may search for "meeting" in the conduct name input area 341, and may select a "meeting" conduct displayed in the conduct type selection area 345.

According to an embodiment, the user may select a category of the new conduct to be generated from among a plurality of categories displayed in a conduct category area 343. In this case, the processor 110 may display at least one type of conduct included in the category selected in the conduct type selection area 345. For example, the user may select a "routine" conduct, in which case a conduct related to a routine may be generated.

According to an embodiment, the user may select, through a details icon 347, the type of new conduct to be generated. The processor 110 may display a menu tree screen 350 including a conduct menu tree 351 in response to receiving a user input for selecting the details icon 347. For example, the user may select a desired conduct type in the displayed conduct menu tree 351. For example, in the conduct menu tree 351, the user may select "Personal Maintenance"—"Meals and Snacks"—"Meal with Family" to select the type of new conduct to be generated as a meal with family.

According to various embodiments, the user may rate each of the plurality of conducts, and may perform feeling evaluation (e.g., good, dislike, expected, difficult) for each of the plurality of conducts. For example, the user may rate a specific conduct at 4.5 out of 5, and may evaluate a feeling about the particular conduct as "Good."

Figure 3D:
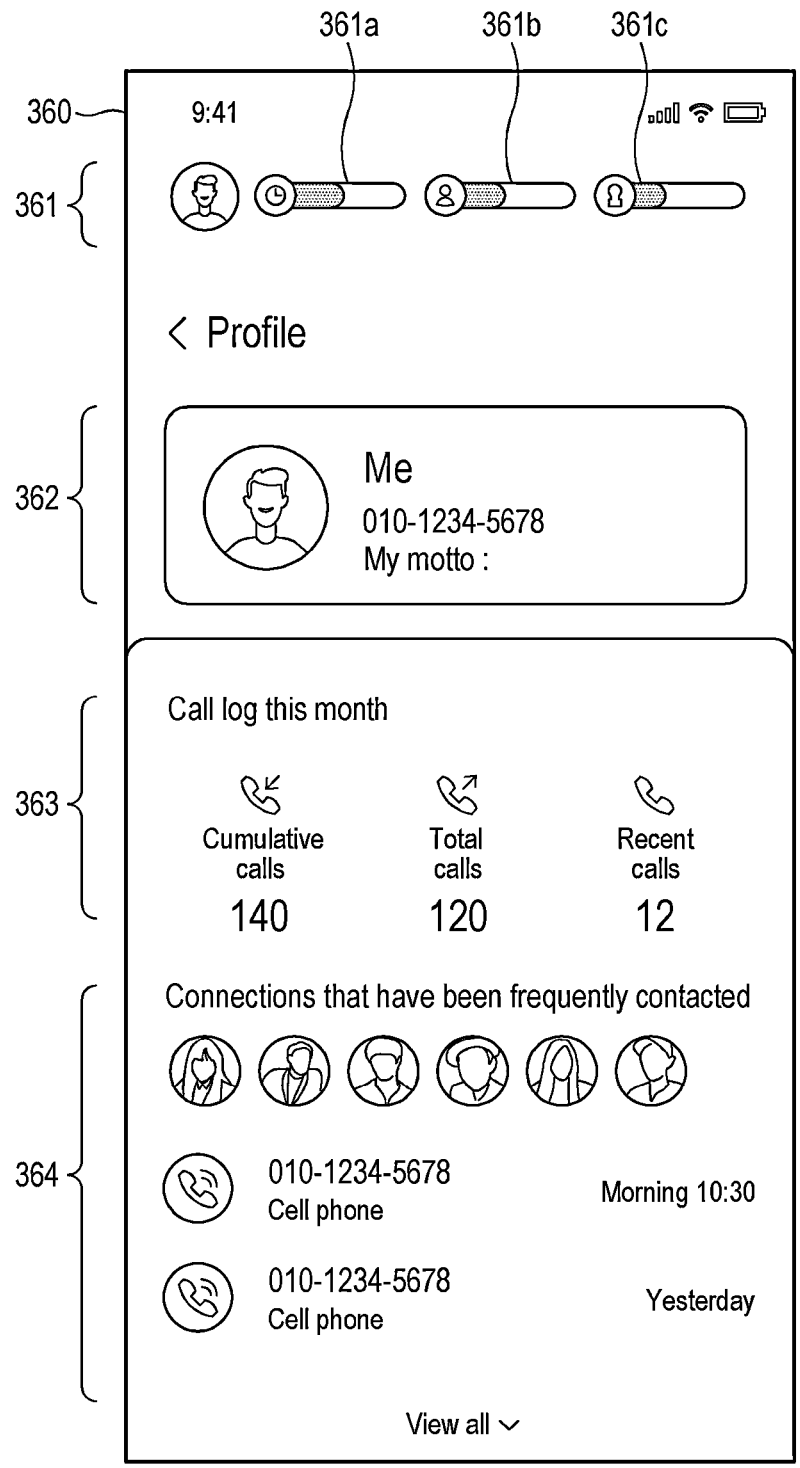
Figure 3F:
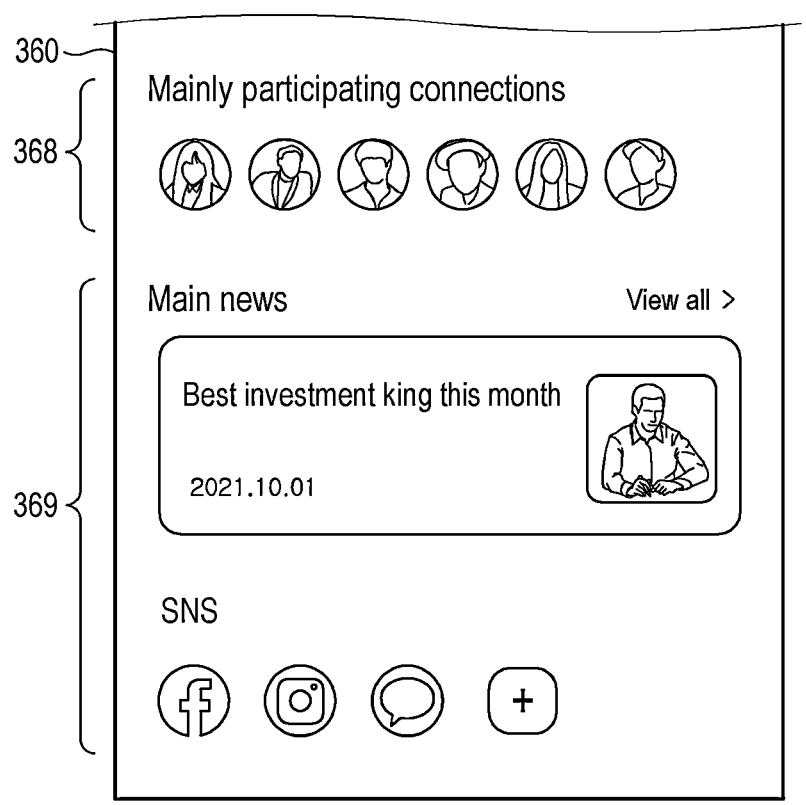

FIGS. 3D, 3E, and 3F illustrate a profile screen 360 of an application according to various embodiments of the present disclosure. The profile screen 360 according to various embodiments may display a status bar display area 361, a personal information display area 362, a call log display area 363, a connections display area 364, an evaluation area 365, a disposition display area 366, a main conduct display area 367, a mainly participating connections area 368, and a news and SNS area 369.

Referring to FIG. 3D, the processor 110 according to various embodiments may display how much time the user is using in the form of a bar graph through a time status bar 361a of the status bar display area 361. The processor 110 may display how many connections the user is using in the form of a bar graph through a connections status bar 361b. The processor 110 may display how many assets the user is using in the form of a bar graph through an asset status bar 361c.

The time status bar 361a is a status bar indicating the degree to which the user utilizes time, and may be generated based on stored information about a plurality of schedules. The information about the plurality of schedules may be information about schedules stored in a plurality of conducts. For example, the time status bar 361a may be generated based on total time of actually performed schedules compared with total time of planned schedules in the plurality of conducts. For example, if the total time of schedules in the plurality of conducts planned to be performed today is 12 hours, the time status bar 361a may be displayed as 50% full.

The connections status bar 361b is a status bar indicating the degree to which a user utilizes connections, and may be generated based on stored information about plurality of contacts. The information about the plurality of contacts may be, for example, information about connections (or schedule information) stored in a plurality of conducts. For example, the connections status bar 361*b* may be generated based on a total of actually performed meetings with connections compared with a total of planned meetings with connections in the plurality of conducts. For example, if a plurality of contacts are contacts of 100 people, and if it is planned to meet 10 people in a week, the connections status bar 361*b* may be displayed as 10% full.

The asset status bar 361*c* is a status bar indicating the degree to which the user utilizes assets, and may be generated based on the user's asset information. The user's asset information may be information about assets stored in the plurality of conducts. According to an embodiment, the asset status bar 361*c* may be generated based on a total of actual assets compared to a total of planned assets in the plurality of conducts. According to an embodiment, the asset status bar 361*c* may be generated based on income and expenditure details planned in the plurality of conducts. For example, if the income of this month is 10 million won and the expenditure is 5 million won, the asset status bar 361*c* may be displayed as 50% full.

In the present embodiment, the time status bar 361*a*, the connections status bar 361*b*, and the asset status bar 361*c* have been described as being displayed on the profile screen 360, but may be displayed in one area of the home screen 300.

The processor 110 according to various embodiments may display the user's personal information in the personal information display area 362. The processor 110 may display at least one of the user's image, phone number, and motto.

The processor 110 according to various embodiments may display the accumulated number of calls, the total number of calls, and the number of recent calls in the call log display area 363. The accumulated number of calls may be, for example, a number obtained by cumulatively summing the number of incoming/outgoing calls and the number of missed calls. The total number of calls may be a number obtained by cumulatively summing the number of incoming/outgoing calls. Recent calls may refer to the number of calls made within a predetermined period (e.g., the last 30 days).

The processor 110 according to various embodiments may display, through the connections display area 364, a predetermined number of connections (e.g., 6 people) which have been most frequently contacted. The processor 110 may display a recent call log through the connections display area 364. The processor 110 may further display a full view icon for additionally showing the recent call log through the connections display area 364. The connections information disclosed herein may match contact information.

Referring to FIG. 3E, the processor 110 according to various embodiments may display a daily score for a performed conduct through the evaluation area 365. The processor 110 according to various embodiments may display connections having a disposition similar to that of the user, among a plurality of connections, through the disposition display area 366.

The processor 110 according to various embodiments may display main conducts in reverse-chronological order through the main conduct display area 367. For example, the processor 110 may display, the main conduct display area 367, information about a conduct "English conversation 1 hour" which is the most recent conduct. The main conducts may refer, for example, to conducts planned to be performed today.

Referring to FIG. 3F, the processor 110 according to various embodiments may display, in the mainly participating connections area 368, information about connections that performed a conduct with the user. The processor according to various embodiments may display main news and SNS sharing icons in the news and SNS area 369.

FIGS. 4A, 4B, 4C, and 4D illustrate a schedule management screen 400 of an application according to various embodiments of the present disclosure. The processor 110 may display the schedule management screen 400 on the display 120, in response to a user input for selecting the schedule management icon 333 of the function selection area 330 in FIG. 3A.

Figure 4A:
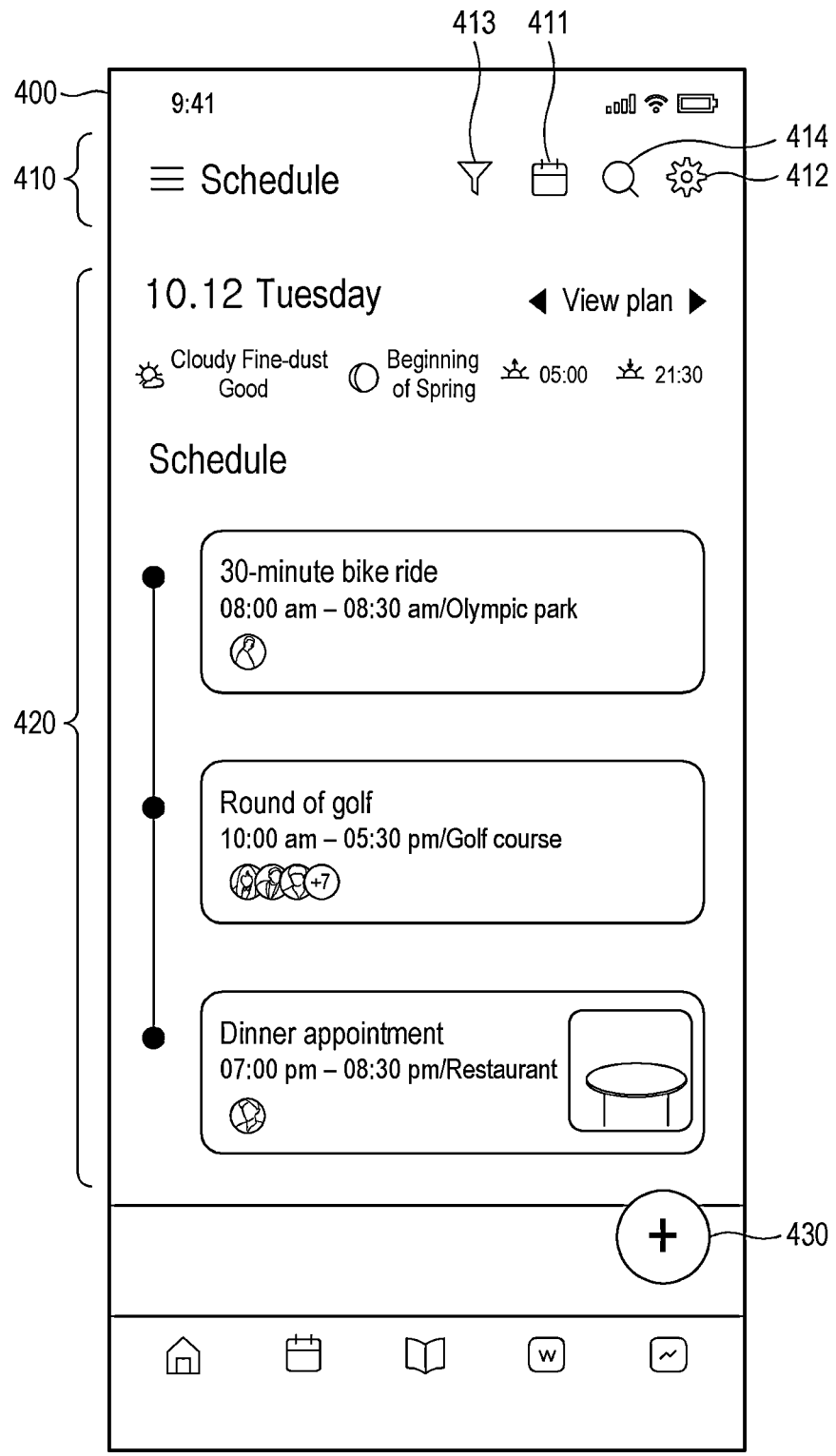
FIGS. 4A, 4B, 4C, and 4D illustrate a schedule management screen of an application according to various embodiments of the present disclosure.

Referring to FIG. 4A, the schedule management screen 400 according to various embodiments may include a setting area 410 and a schedule display area 420. The processor 110 may display input information about a plurality of schedules on the schedule display area 420 of the schedule management screen 400 through various view types. The processor 110 may display a schedule management screen of various view types in response to a user input of selecting a calendar icon 411. The view types may include, for example, a monthly calendar, an annual calendar, a daily calendar, or a calendar for a lifetime or each schedule.

The processor 110 according to various embodiments may display various pieces of upcoming schedule information on the schedule display area 420, based on a conduct of the user that has been inputted. That is, the processor 110 may display at least one conduct including schedule information, among a plurality of registered conducts, in the schedule display area 420. "Schedule information" described herein may imply a conduct including schedule information. If the schedule display area 420 is set to "viewing plans," a planned conduct among the plurality of registered conducts may be displayed. For example, if a planned conduct related to "riding a bicycle for 30 minutes" is registered, the processor 110 may display information about the corresponding conduct in the schedule display area 420. For example, if a planned conduct related to "playing a round of golf" is registered, the processor 110 may display information about the corresponding conduct in the schedule display area 420. For example, the processor 110 may display today's schedule information in the schedule display area 420.

As described above, if the schedule display area 420 is set to "view performance," performance conducts among the plurality of registered conducts may be displayed. Furthermore, when the schedule display area 420 is set to "view together," a plurality of conducts including all of the planned conducts and the performance conducts may be displayed together.

The processor 110 according to various embodiments may further display a conduct addition icon 430. In response to receiving a user input for selecting the conduct addition icon 430, the processor 110 may display a conduct generation screen such that the user can generate a new conduct. A specific method for generating a conduct will be described later.

The processor 110 according to various embodiments may display the calendar icon 411, a setting icon 412, a filter icon 413, and a search icon 414 in the setting area 410. The calendar icon 411 may be an icon for displaying schedule information in a calendar format type, the setting icon 412 may be an icon for managing settings related to schedule information, the filter icon 413 may be an icon for filtering and displaying only a desired conduct, and the search icon 414 may be an icon for searching for a specific conduct.

The processor 110 according to various embodiments may display various pieces of schedule information of the user in a calendar type, in response to a user input for selecting the calendar icon 411. A calendar may include, for example, a daily calendar, a monthly calendar, an annual calendar, or a calendar for a lifetime or each schedule.

Figure 4B:
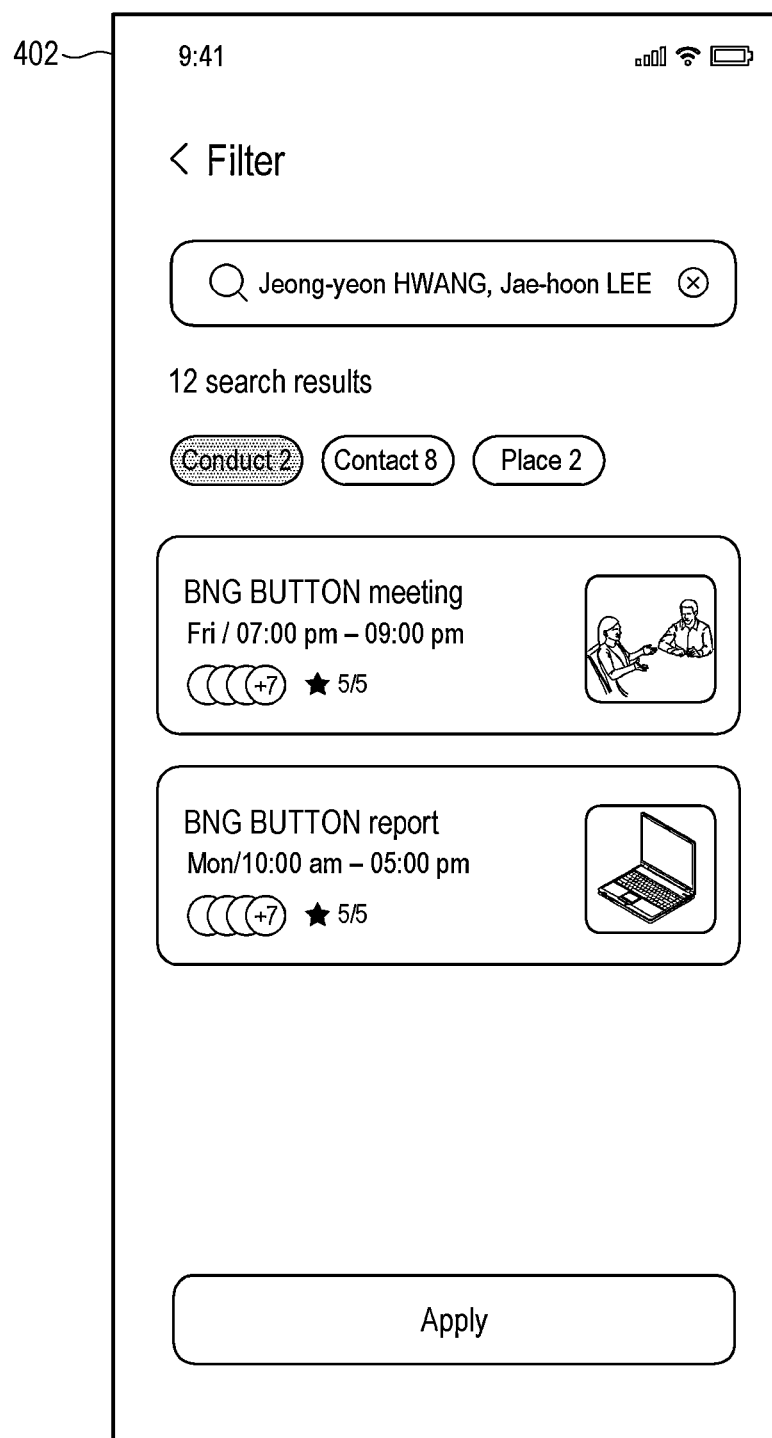
Figure 4C:
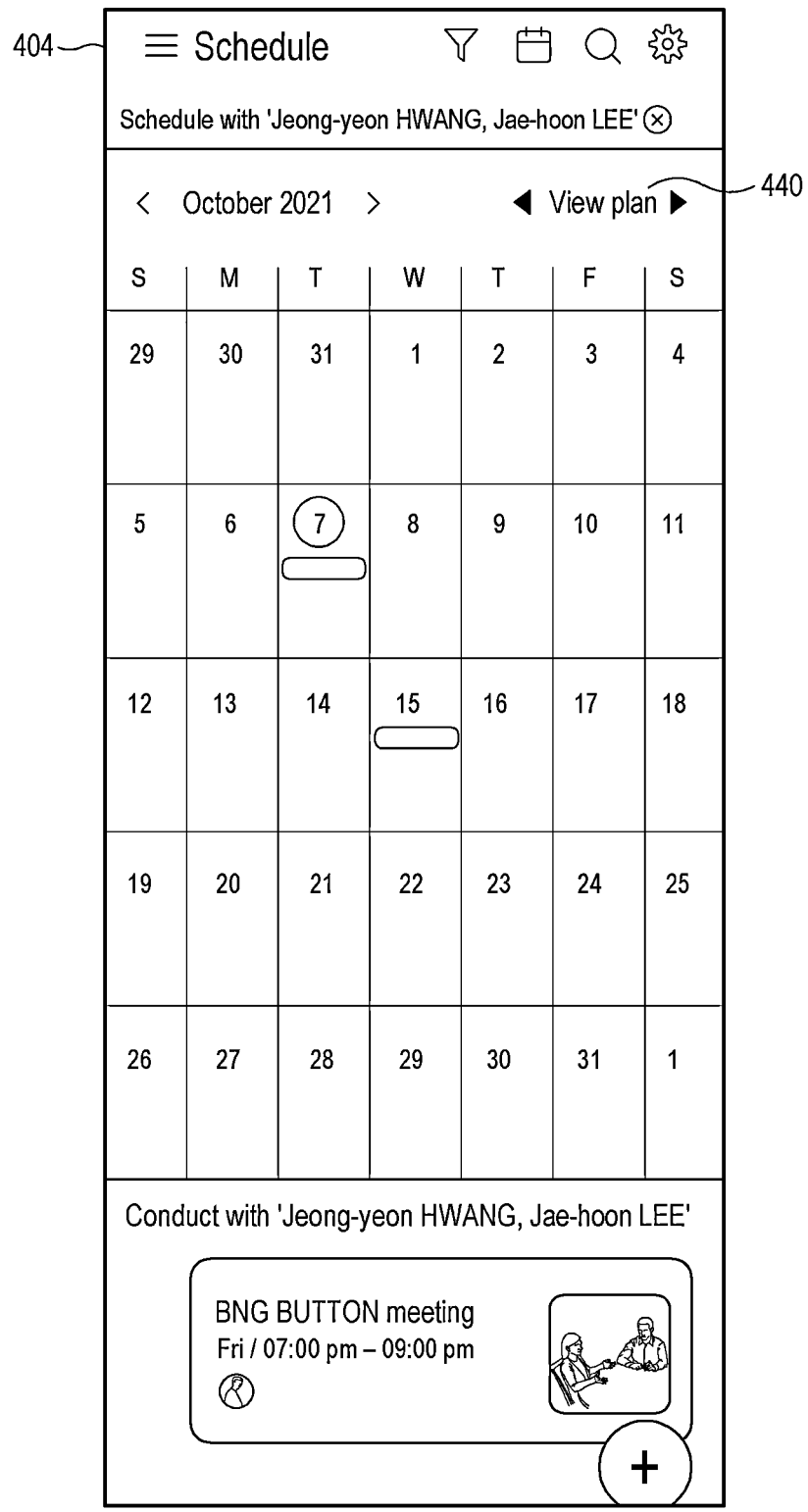

The processor 110 according to various embodiments may input a filtering search word for filtering only desired schedule information among the various pieces of schedule information, in response to a user input for selecting the filter icon 413. For example, when a user input for selecting the filter icon 413 is received, the processor 110 may display, as shown in FIG. 4B, a filtering screen 402 in which a filtering search word can be input. When "Jeong-Yeon HWANG" and "Jae-Hoon LEE" are input in the search window, the processor 110 may filter and display only schedule information (conduct) related to "Jeong-Yeon HWANG" and "Jae-Hoon LEE" among various pieces of schedule information. Even in this case, as illustrated in FIG. 4B, the schedule information (conduct) related to "Jeong-Yeon HWANG" and "Jae-Hoon LEE" may be displayed in the schedule display area, or as illustrated in FIG. 4C, the schedule information (conduct) related to "Jeong-Yeon HWANG" and "Jae-Hoon LEE" may be displayed in a calendar type in a schedule calendar screen 404.

Figure 4D:
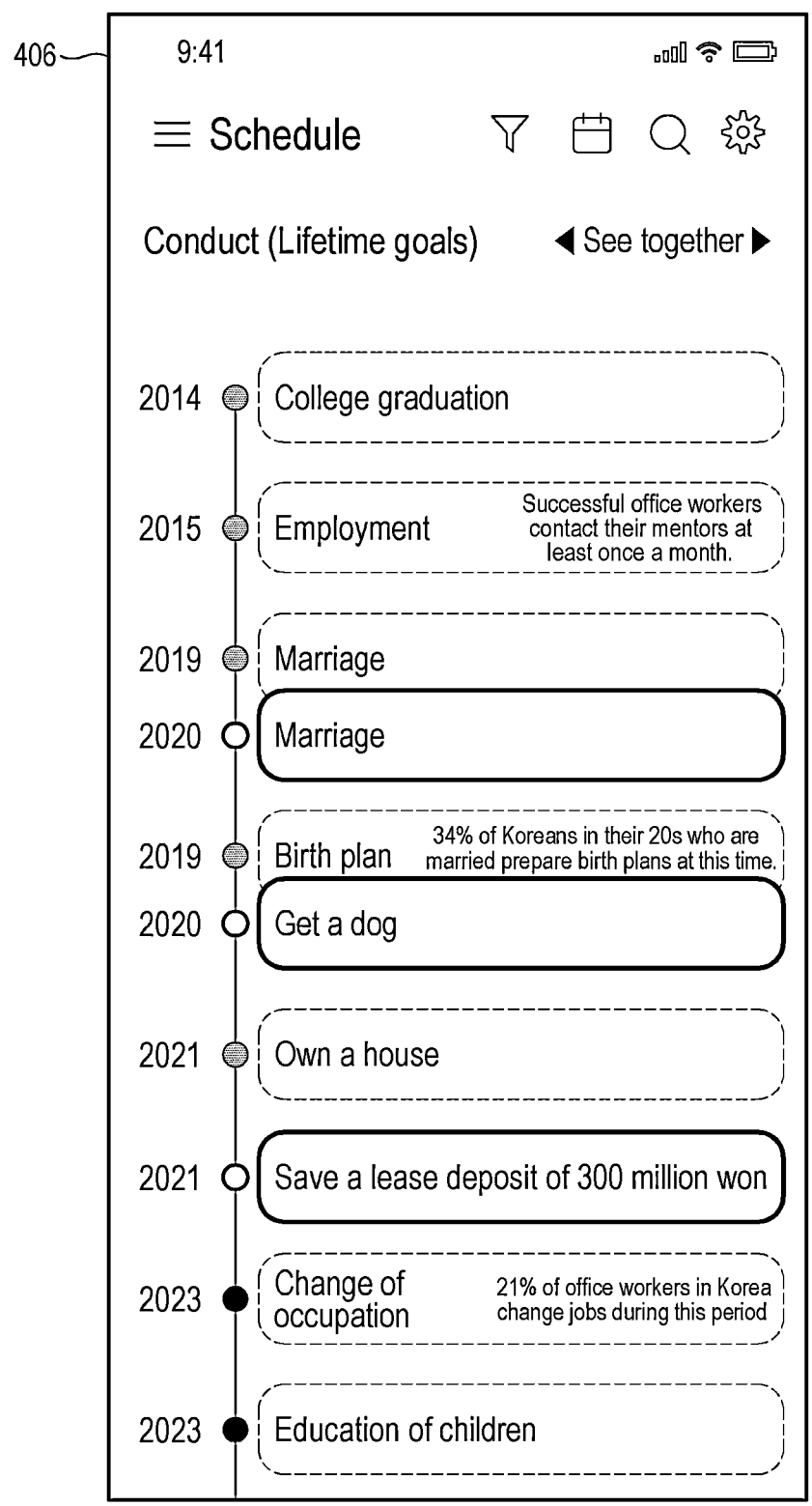

The processor 110 according to various embodiments may display information about a plurality of schedules through various view types, and as illustrated in FIG. 4D, may display lifetime schedule information at a glance through a lifetime goal screen 406. In the above case, planned schedule information (planned conduct) may be displayed when "viewing plans" is set, only schedule information (performance conduct) actually achieved (or performed), among information about a plurality of planned schedules, may be displayed when "view performance" is set, and the planned schedule information and the actually achieved schedule information may be displayed together when "view together" is set. FIG. 4D illustrates an example of the lifetime goal screen 406 set to "view together," and the planned schedule information and the actually achieved schedule information are displayed together. When "view together" is set, the planned schedule information (planned conduct) and the actually achieved schedule information (performed conduct) may be displayed to be distinguished from each other. For example, the edge of planned schedule information (planned conduct) may be indicated by a dotted line, and the actually achieved schedule information (performance conduct) may be indicated by a thick solid line. For example, planned schedule information (planned conduct) may not include an edge, but the actually achieved schedule information (performance conduct) may include an edge having a specific color (e.g., purple). The above-described method for displaying the planned schedule information and the actually achieved schedule information to be distinguished from each other is not limited thereto, and various display methods may be applied.

The processor 110 according to various embodiments may display, in response to a user input for selecting information about one schedule from information about a plurality of schedules, a detailed schedule screen for the selected schedule information. The detailed schedule screen for the selected schedule information may include detailed information registered for the selected schedule information, income and expenditure information, or photos and music information.

FIGS. 5A, 5B, 5C, 5D, 5E, 5F, and 5G illustrate a conduct generation screen of an application according to various embodiments of the present disclosure.

Figure 5A:
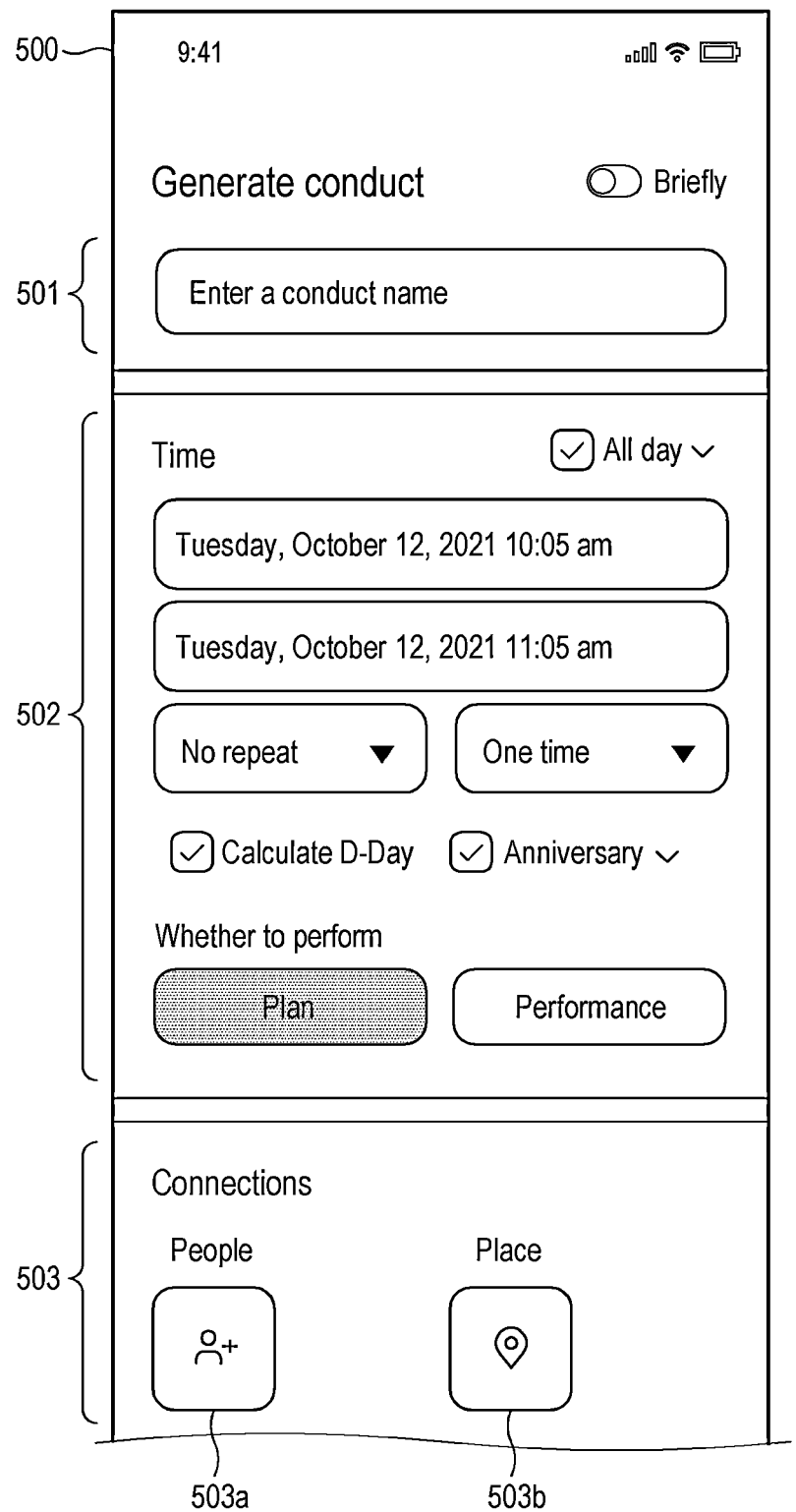
FIGS. 5A, 5B, 5C, 5D, 5E, 5F, and 5G illustrate a conduct generation screen of an application according to various embodiments of the present disclosure.
Figure 5B:
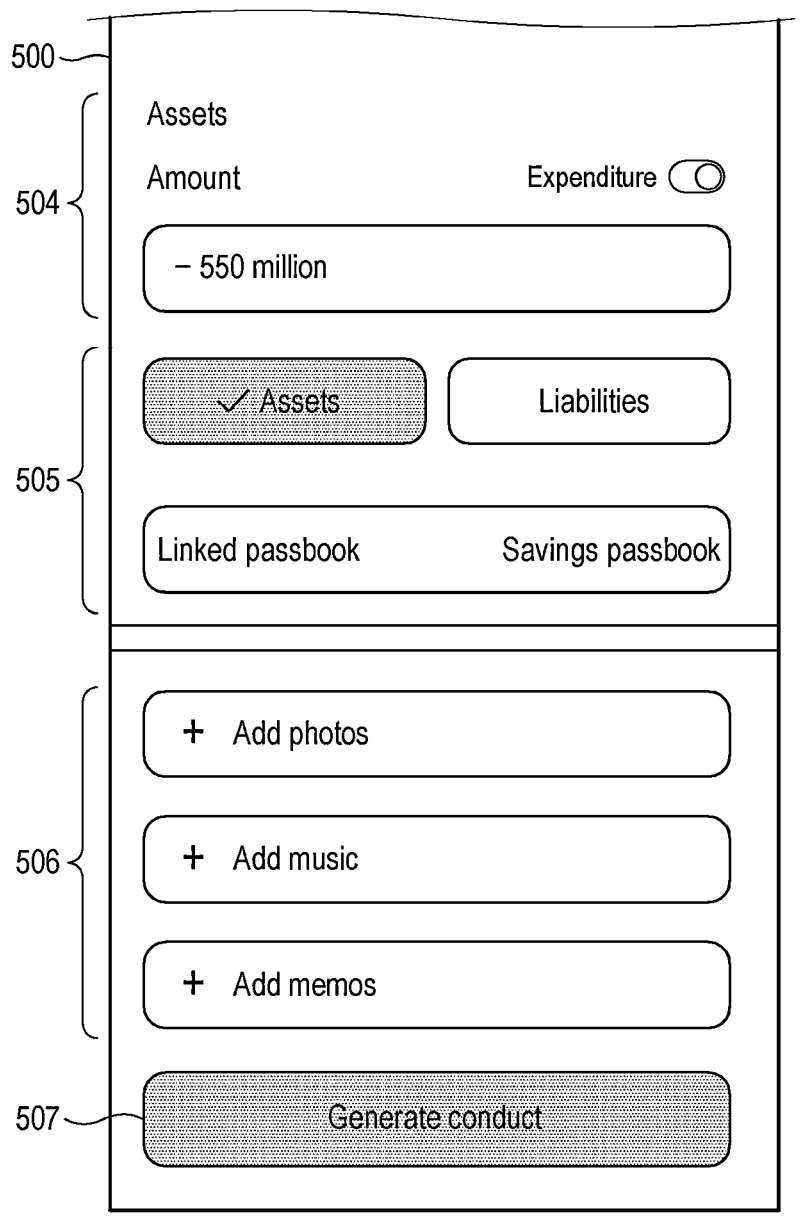

Referring to FIGS. 5A and 5B, the processor 110 may display a conduct generation screen 500 for generating a new conduct. The conduct generation screen 500 according to various embodiments may include a name input area 501 for inputting a name of a conduct to be generated, a schedule input area 502 for inputting schedule information of the conduct to be generated, a connections input area 503 for inputting connections information related to the conduct to be generated, asset input areas 504 and 505 for inputting assets related to the conduct to be generated, and other input area 506 for adding a photo, music, or a memo related to the conduct to be generated.

A user may input the name of a conduct to be generated into the name input area 501. The user may input the schedule of the conduct to be generated into the schedule input area 502. The user may input information about activity frequency, activity time, participants, and costs through the schedule input area 502. The frequency may be set to, for example, a reference period (e.g., daily, weekly, or monthly) and the number of activities (e.g., once, twice, or three times) during the reference period.

The user may use a connections icon 503a of the connections input area 503 to add connections information related to a conduct to be generated. For example, when the user wants to perform the corresponding conduct with connections A, the user may add information (or contact information) about the connections A through the connections icon 503a. The user may use a location icon 503b of the connections input area 503 to add location information related to the conduct to be generated. For example, the user may add location information through the location icon 503b when performing the corresponding conduct in area A.

Figure 5C:
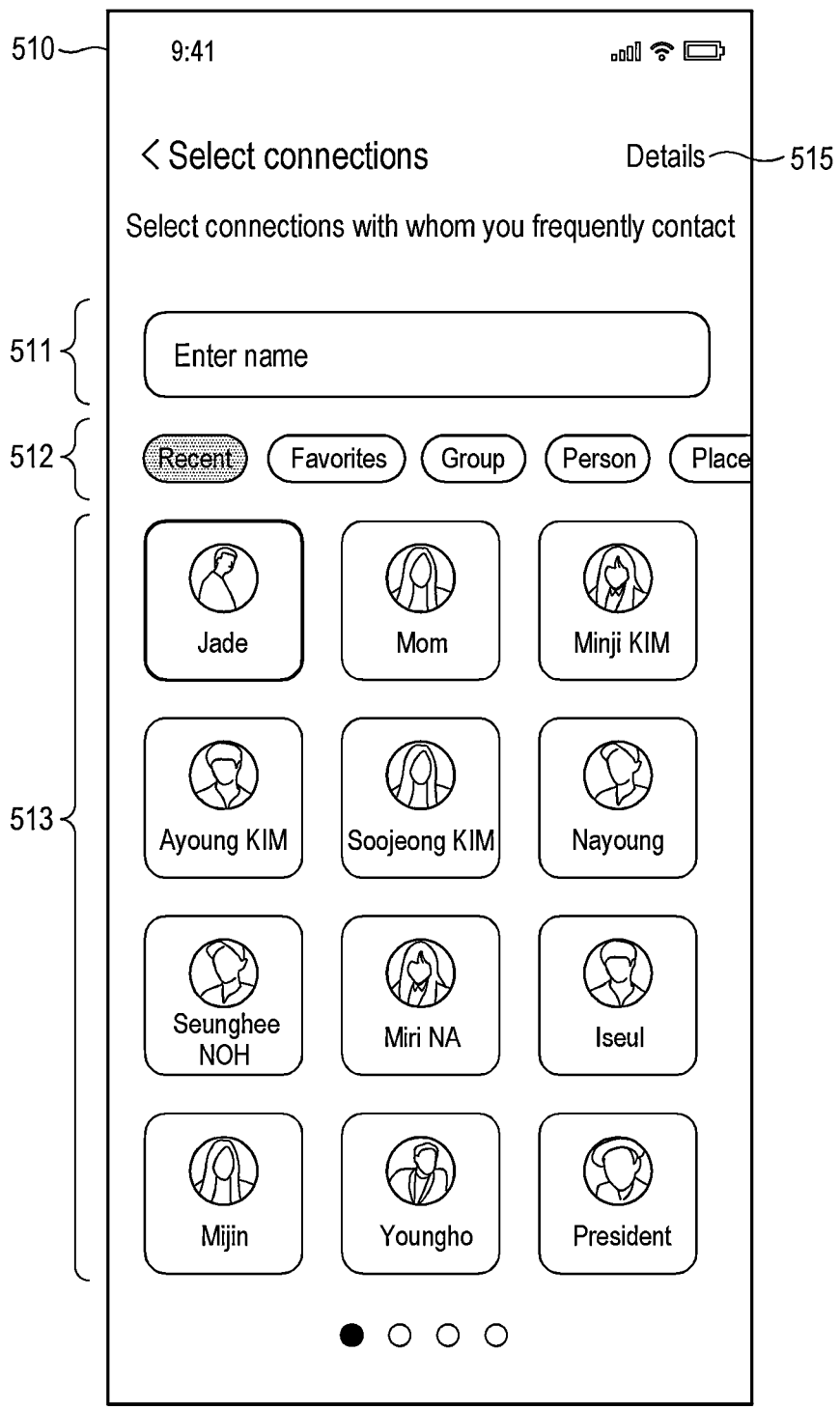

For example, the processor 110 may display a connections selection screen 510 as illustrated in FIG. 5C in response to receiving a user input for selecting the connections icon 503a. The processor 110 may display the connections selection screen 510 which includes a connections search window 511 for searching for connections to be input, a connections category tab 512 for categorizing the connections, and a connections display area 513 for displaying the connections in the form of buttons. The user may directly search for connections to be input through the connections search window 511, may select a desired connections category in the connections category tab 512 and then search for connections, and may directly search for the connections to be input from among connections displayed in the connections display area 513. The processor may display information about a plurality of connections as a list, in response to a user input for selecting a details icon 515. The list may recommend connections that are frequently met, or may sort and display connections in alphabetical order.

The user may input information about an asset or a debt in the asset input areas 504 and 505 related to a conduct to be generated. The user may also input information about an asset-related passbook (e.g., a savings passbook). The user may input information about a passbook related to debt (e.g., a negative passbook). The user may also input income or expenditure details of the corresponding conduct. The user may input photos, music or memos related to the conduct to be generated into the other input area 506.

Figure 5D:
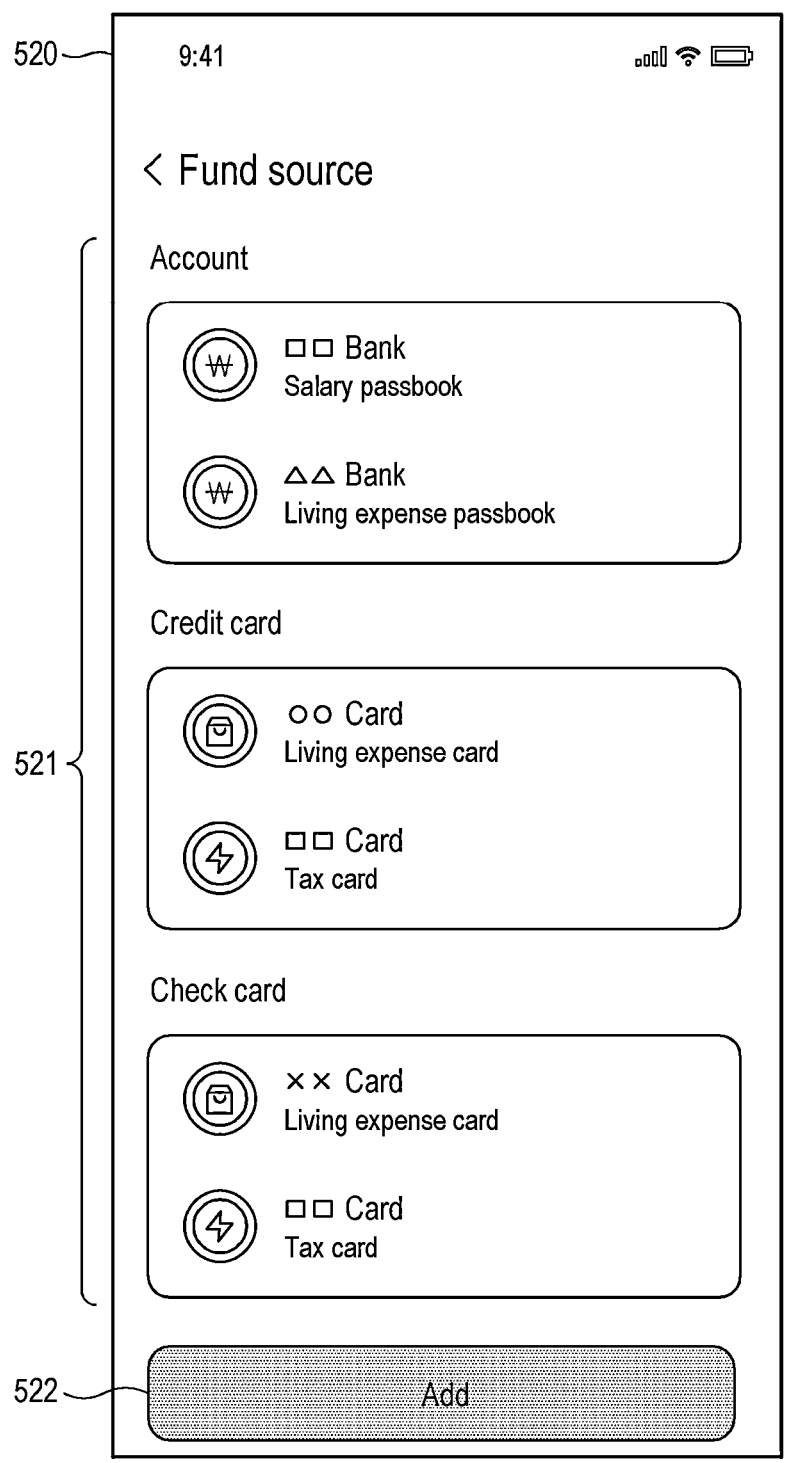

For example, the processor 110 may display a fund source selection screen 520 as illustrated in FIG. 5D in response to receiving a user input for selecting a linked passbook in the asset input areas 504 and 505. The fund source selection screen 520 may include a fund source selection area 521 where various bank accounts, credit cards, and check cards can be selected. The user may input a fund source (a passbook related to an asset) by selecting the corresponding fund source and selecting an addition icon 522.

The processor 110 according to various embodiments may generate a conduct in response to a user input for selecting a conduct generation icon 507. For example, when the user has completed inputting information related to the conduct to be generated as described above, the user may select the conduct generation icon 507 to generate a new conduct. A default value may be applied to items, which have not been input by the user, among the above-mentioned contents.

Figure 5E:
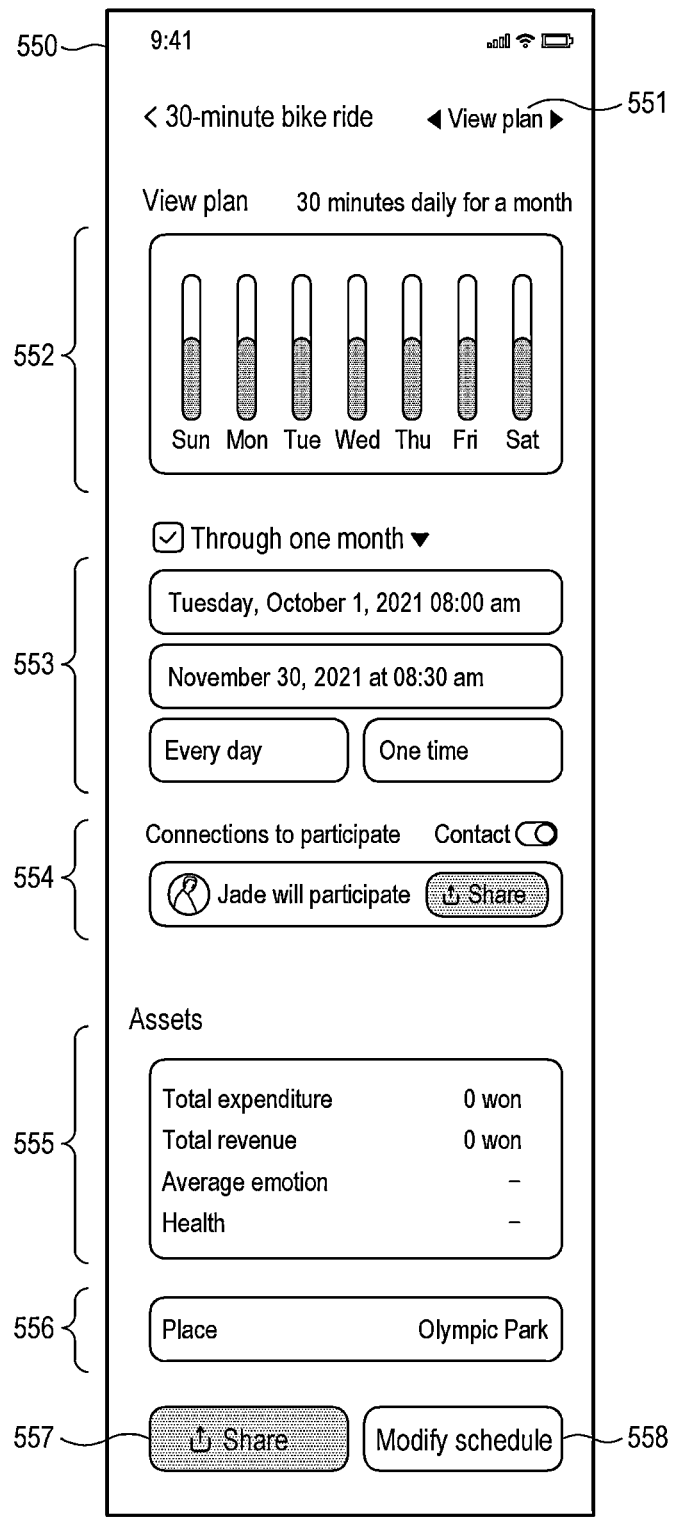

FIG. 5E illustrates a conduct-details view screen 550 displaying the generated conduct according to various embodiments of the present disclosure. The conduct-details view screen 550 illustrated in FIG. 5E is a screen that has been set to "viewing plans" 551, and may be a screen displaying plan information of the generated conduct. Referring to FIG. 5E, the processor 110 may generate a conduct, based on the information input through the above-described process. The conduct-details view screen 550 may include a plan viewing area 552, a schedule area 553, a connections area 554, an asset area 555, and a place area 556. For example, the user may generate a conduct which has the name "30-minute bike ride," which has plan information (schedule information) of riding a bike for 30 minutes from 8:30 AM every day for the whole month, in which the user participates with "Jade" and which is performed in "Olympic Park."

The processor 110 according to various embodiments may share information about the corresponding conduct with other connections, in response to a user input for selecting a share icon 557. The processor 110 may also modify some contents of the corresponding conduct through a schedule modification icon 558.

Figure 5F:
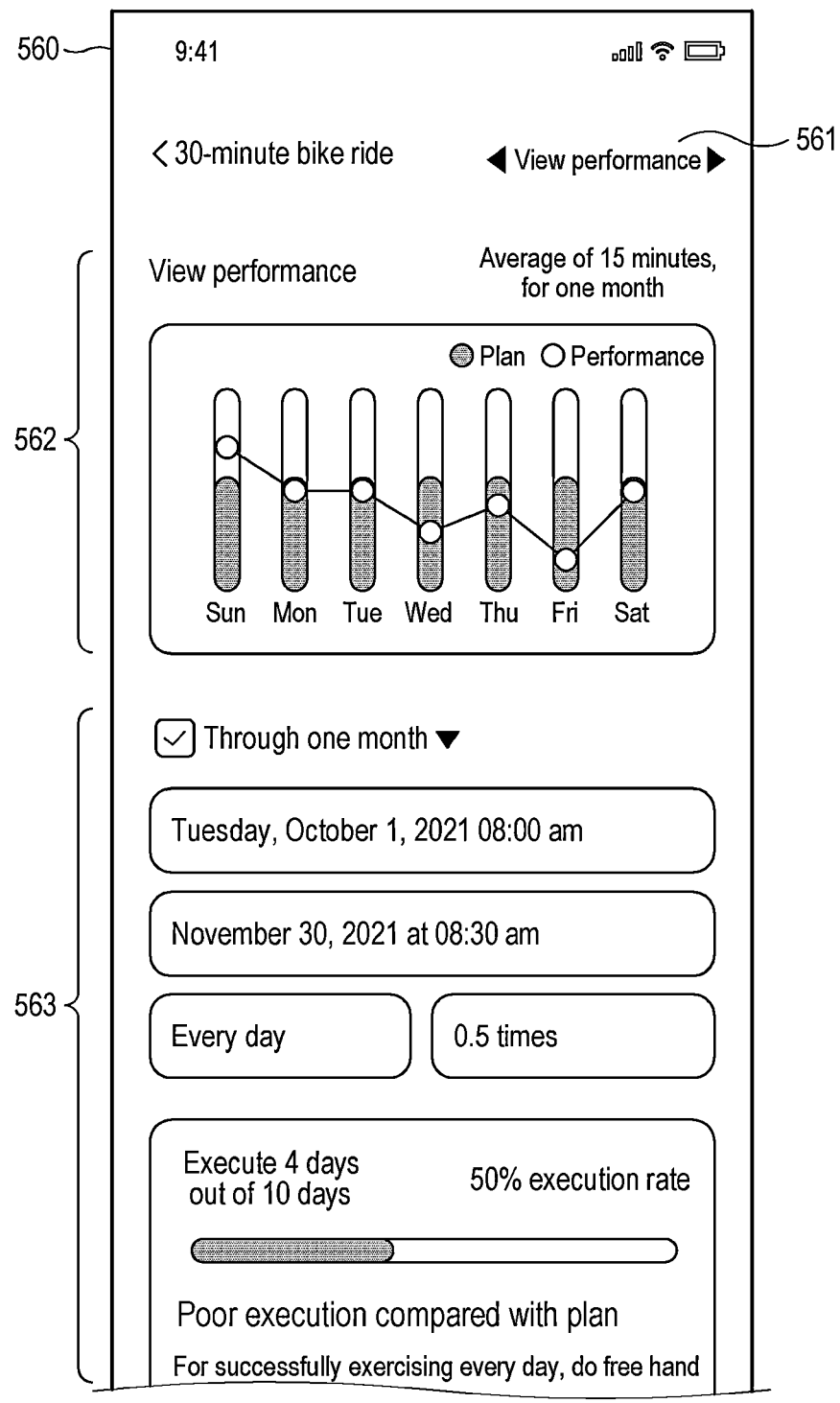
Figure 5G:
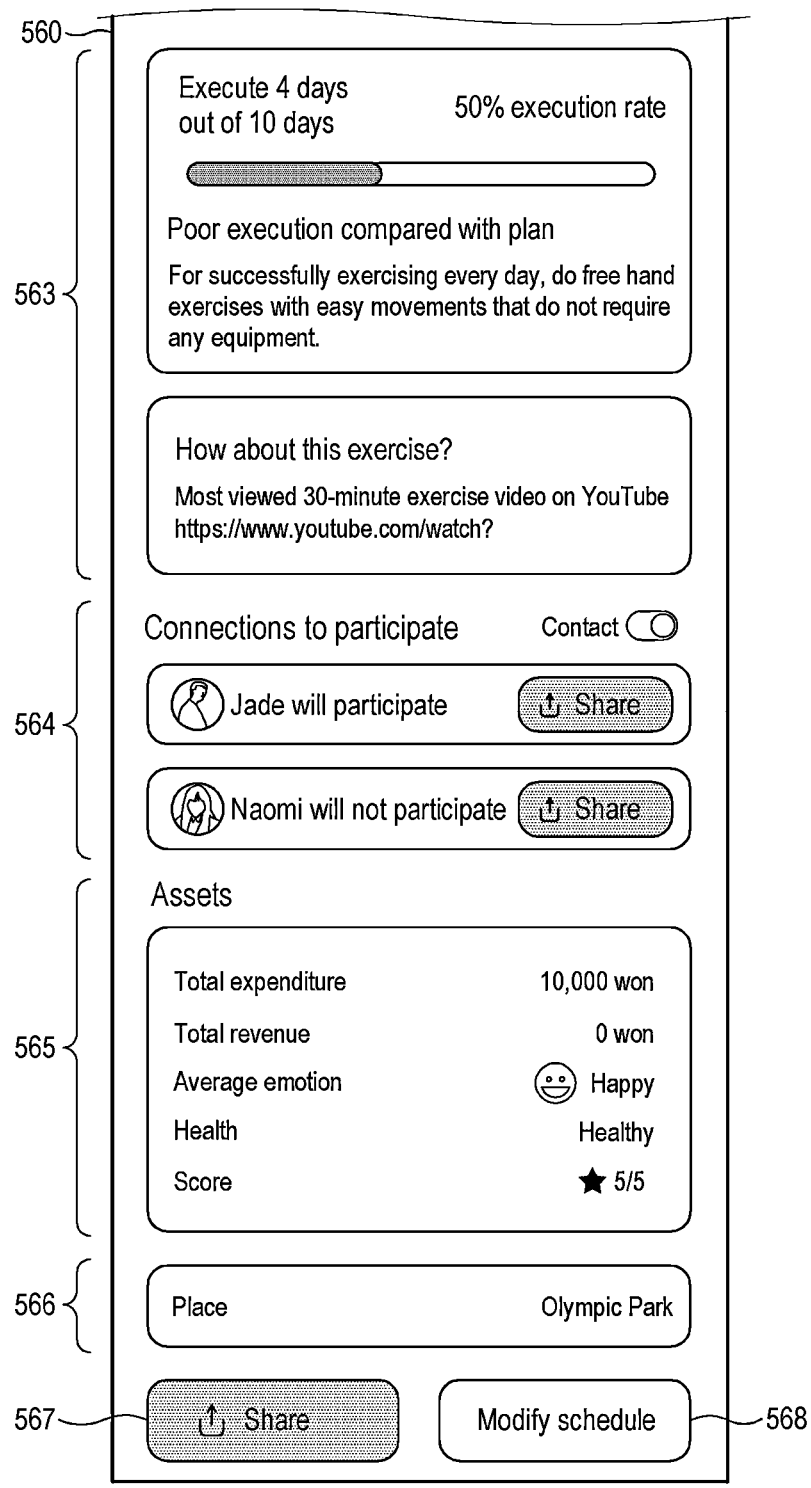

FIGS. 5F and 5G illustrate a conduct-details view screen 560 of a generated conduct according to various embodiments of the present disclosure. The conduct-details view screen 560 illustrated in FIG. 5F is a screen that has been set to a performance view 561, and may be a screen displaying performance information of the generated conduct. The performance information of the generated conduct may include actual performance details of the corresponding conduct.

Like the conduct-details view screen 560 in FIG. 5E, the conduct-details view screen 560 may include a performance view area 562, a schedule area 563, a connections area 564, an asset area 565, and a place area 566.

The processor 110 may display, in a graph, how much a corresponding conduct is achieved, and may display an execution rate. For example, the processor 110 may generate and display, through the performance view area 562, a graph showing how much the corresponding conduct has actually been performed compared to the plan thereof. For example, the processor 110 may calculate and display, through the schedule area 563, an execution rate for the performance of the corresponding conduct compared to a plan of the corresponding conduct. Here, a comment on the calculated execution rate may be further displayed. For example, the processor 110 may further display comments such as "The execution rate is low compared to the plan."

For example, the processor 110 may display, in the connections area 564, whether connections registered in the corresponding conduct have participated. For example, the processor 110 may display, in the asset area 565, how much asset registered in the corresponding conduct has been used.

The processor 110 according to various embodiments may share information about the corresponding conduct with other connections, in response to a user input for selecting a share icon 567. The processor 110 may also modify some contents of the corresponding conduct through a schedule modification icon 568.

The processor 110 according to various embodiments may set the screen to "view plans" as illustrated in FIG. 5E to display planned contents about the corresponding conduct, may set the screen to "view performance" as illustrated in FIGS. 5F and 5G to display an actually achieved (or performed) content among contents of a planned conduct, or may set the screen to "view together" to display the planned conduct and the actually achieved content together.

Figure 6:
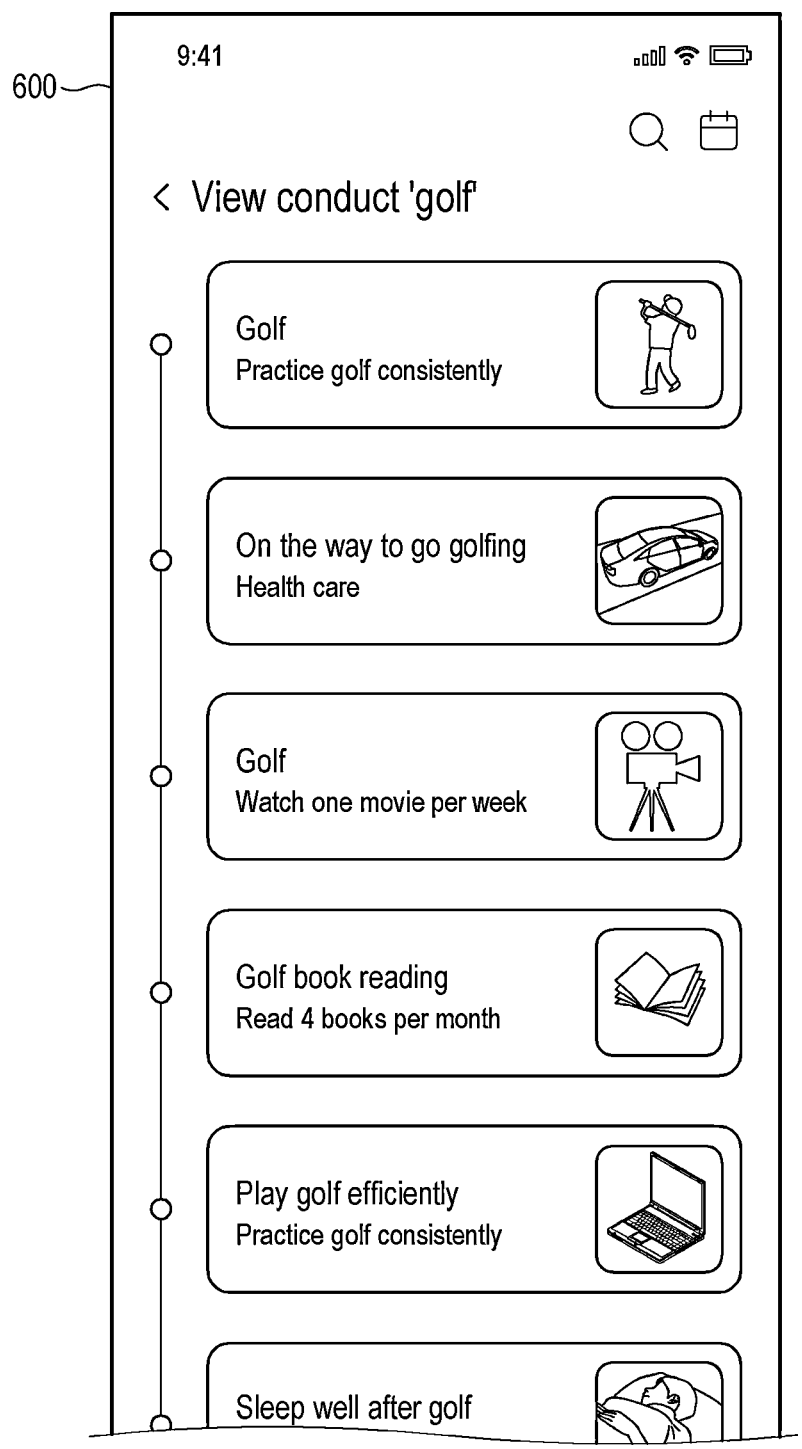
FIG. 6 illustrates a conduct list screen of an application according to various embodiments of the present disclosure.

FIG. 6 illustrates a conduct list screen 600 of an application according to various embodiments of the present disclosure.

The processor 110 according to various embodiments may collect conducts having a specific conduct name and display the collected conducts in the form of a list. For example, the processor 110 may collect conducts related to "golf" and display the same on the conduct list screen 600. The user may select a specific conduct displayed in the list to determine detailed information about the specific conduct.

Figure 7:
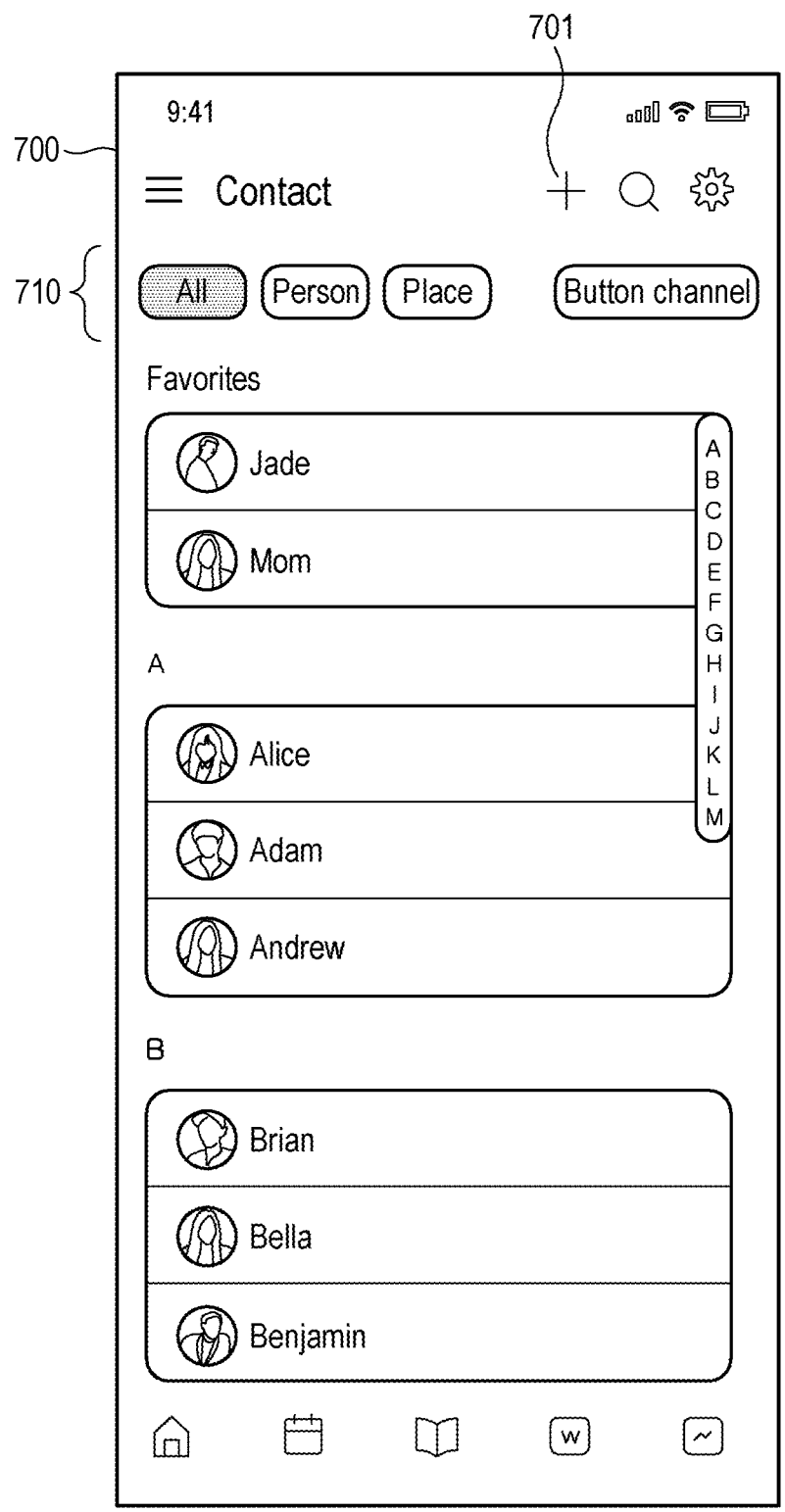
FIG. 7 illustrates connections management screen of an application according to various embodiments of the present disclosure.

FIG. 7 illustrates a connections management screen of an application according to various embodiments of the present disclosure. In the present drawing, connections information may imply contact information. In addition, the contact information may include contact information related to a person and contact information related to a place.

Referring to FIG. 7, the processor 110 of the electronic device 100 according to various embodiments of the present disclosure displays a connections management screen 700 when a user input for selecting the connections management icon 335 is received on the home screen 300 illustrated in FIG. 3A. The connections management screen 700 may include, for example, a connections classification tab 710. The connections management screen 700 in FIG. 7 may be a contact list screen that displays contacts in the form of a list. That is, the connections management screen 700 may include a plurality of contacts.

The processor 110 according to various embodiments may display an addition icon 701 for adding a contact. The processor 110 may display a screen for adding a contact, in response to receiving a user input for selecting the addition icon 701. The user may input information about a new contact on the screen for adding the contact. The new added contact may be stored in the storage 130.

The processor 110 according to various embodiments may display a plurality of contacts on the connections management screen 700. For example, the processor 110 may display the plurality of contacts on the connections management screen 700, based on the plurality of contacts stored in the storage 130. The processor 110 may display the name and image of a person corresponding to each of the plurality of contacts together with the contact thereof. For example, the processor 110 may display a contact about "Jade" in one area of the connections management screen 700.

The processor 110 according to various embodiments may filter and display only contact information about a person or contact information about a place through the connections classification tab 710. The processor 110 may display a button channel screen including a recommended button channel and a user's button channel, in response to a user input for selecting a button channel. The button channel, for example, may imply contact information registered in a server.

The processor 110 according to various embodiments may display a name search icon on the connections management screen 700. For example, the user may easily input the name of a person, for whom the user wants to search, through the name search icon to easily find the name of the person.

The processor 110 according to various embodiments may receive a user input for selecting one contact from among the plurality of displayed contacts. The processor 110 may display a detailed screen for displaying and managing various pieces of information related to the selected contact in response to the reception of one of the plurality of contacts.

Figure 8A:
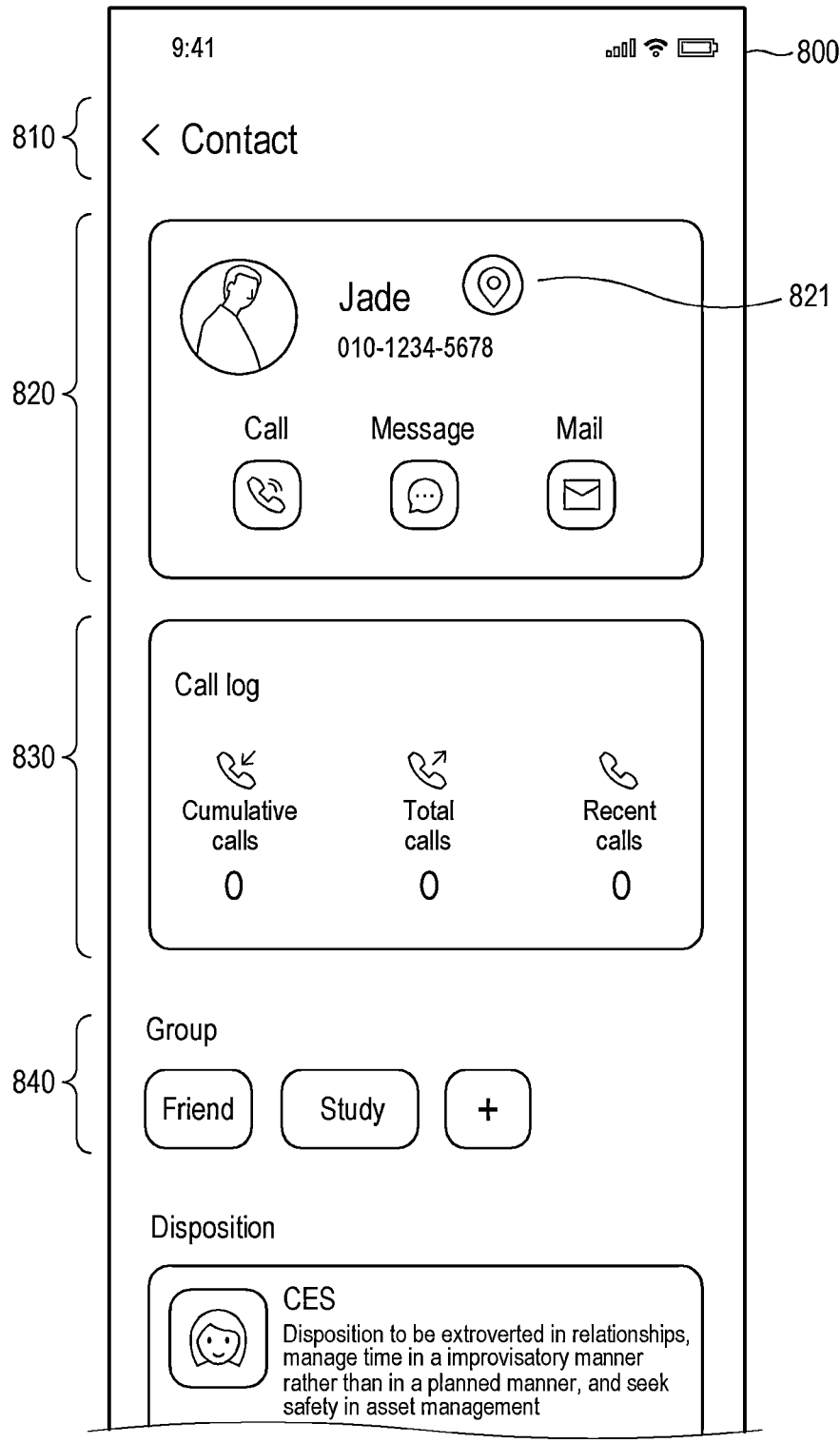
FIGS. 8A and 8B illustrate a contact details screen according to various embodiments of the present disclosure.
Figure 8B:
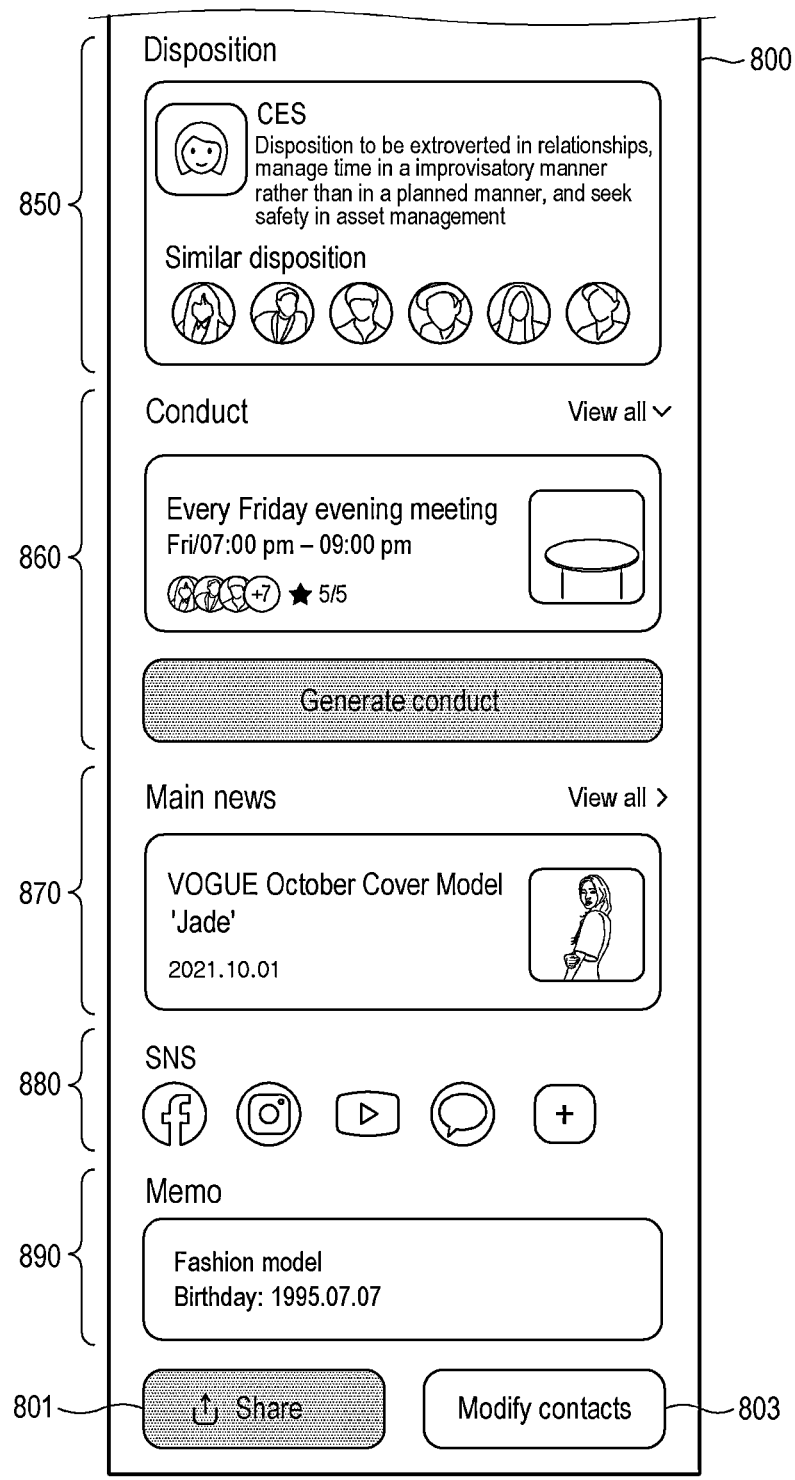

FIGS. 8A and 8B illustrate a contact details screen 800 for displaying information related a specific contact (or specific connections). In the present drawing, for convenience of description, the description will be made assuming that a contact related to Jade is selected from among the plurality of contacts displayed on the connections management screen 700 of FIG. 7. For example, the contact details screen 800 may include a plurality of pages, or may include one scrollable page.

The contact details screen 800 according to various embodiments may include a return area 810, a profile area 820, a call log area 830, a group area 840, a disposition area 850, a conduct area 860, a main news area 870, an SNS area 880, and a memo area 890.

When a user input for selecting a return icon displayed in the return area 810 is received, the processor 110 according to various embodiments may return to the connections management screen. The processor 110 may display a name, a phone number, or an image related to each of relevant connections in the profile area 820. In case of contact information about a place, the processor 110 may further display a location icon 821 indicating location information. The processor 110 may further display a communication application icon that allows the user to communicate with a selected contact. The communication application may include at least one among, for example, a call application, a short message service (SMS) application, a multimedia messaging service (MMS) application, an e-mail application, an instant message application, and an SNS application. When a user input for selecting a communication application is received, the processor 110 may execute the selected communication application. For example, when a user input for selecting a call application is received, the processor 110 may execute the selected call application to make a call to Jade's phone number.

The processor 110 according to various embodiments may display the number of cumulative calls, the total number of calls, and the number of recent calls in the call log area 830. The number of cumulative calls may be a number obtained by cumulatively summing, for example, the number of incoming/outgoing calls and the number of missed calls. The total number of calls may be a number obtained by summing the number of incoming/outgoing calls. The number of recent calls may be the number of calls that are made within a predetermined time period (e.g., last 30 days).

The processor 110 according to various embodiments may display information about a group including the relevant connections in the group area 840. For example, the processor 110 may display, in the group area 840, information indicating that the relevant connections belong to a "friend" group and a "study" group. The processor 110 according to various embodiments may display the disposition of each of the relevant connections in the disposition area 850. The processor 110 may also display information about other connections having dispositions similar (or identical) to those of the relevant connections in the disposition area 850 together.

The processor 110 according to various embodiments may display conduct information related to relevant connections in the conduct area 860. The processor 110 may further display a conduct generation icon for allowing the user to directly generate a new conduct related to the corresponding connections. The conduct may be information about a schedule or activity with a person corresponding to a selected contact. The processor 110 may display details of the conduct in response to a user input for selecting the conduct.

The processor 110 according to various embodiments may display news information related to the relevant connections in the news area 870. The processor 110 according to various embodiments may display an SNS sharing icon in the SNS area 880. The processor 110 according to various embodiments may display a memo related to the relevant connections in the memo area 890.

The processor 110 according to various embodiments may share information about the relevant connections with other connections in response to receiving a user input for selecting a sharing icon 801. The processor 110 according to various embodiments may modify contact information of relevant connections through a contact modification icon 803. When a user input for selecting the contact modification icon 803 is received, the processor 110 may display a screen for editing detailed information of the contact.

Figure 9A:
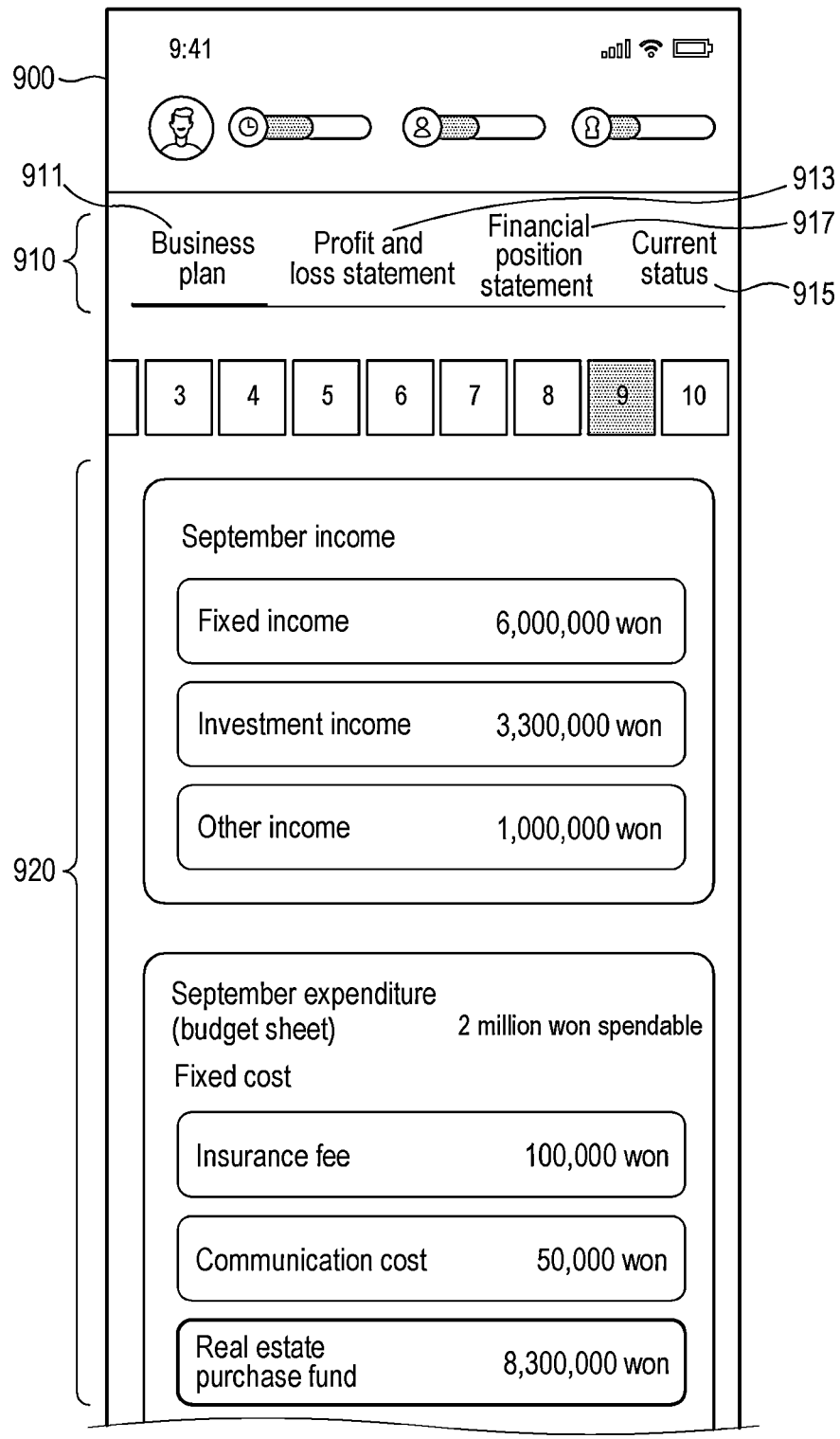

FIGS. 9A and 9B illustrate a business plan screen 900 among asset management screens according to various embodiments of the present disclosure. For example, when a user input for selecting the asset management icon 337 of the function selection area 330 in FIG. 3A is received, the processor 110 may display an asset management screen. The processor 110 according to various embodiments may generate and display a business plan, a profit and loss statement, a statement of financial position, and a current status as part of asset management. For example, a user may move to a desired asset management screen by selecting one of a business plan tab 911, a profit and loss statement tab 913, a financial position statement tab 917, and a current status tab 915 of an asset management tab area 910. FIGS. 9A and 9B illustrate the business plan screen 900 among asset management screens.

The processor 110 according to various embodiments may generate a business plan based on a plurality of conducts including information on income and expenditure. The processor 110 may determine monthly income and expenditure planned (included) in the plurality of conducts, and may generate a monthly business plan based thereon. A business plan, for example, may be generated on a monthly basis, and may include monthly income and expenditure.

The processor 110 may determine the planned monthly income and expenditure, based on the plurality of conducts, and may generate a monthly business plan based on the determined monthly income and expenditure. The processor 110 may calculate a total sum of a plurality of planned income and expenditure details in relation to the plurality of conducts, respectively. The processor 110 may display details of the generated monthly business plan in a business plan display area 920. Monthly income may include, for example, fixed income, investment income, and other income. Monthly expenditure may include fixed and variable costs. That is, the processor 110 may generate a monthly business plan by extracting monthly income and expenditure contents included in the plurality of registered conducts. In addition, the user may directly add monthly expenditure or income on the business plan screen 900.

For example, when September income is planned to be a fixed income of 6,000,000 won, an investment income of 3,300,000 won, and other income of 1,000,000 won when based on the plurality of conducts, the processor 110 may generate a September business plan based on the above-mentioned planned September income. In the same way, the processor 110 may generate a September business plan by determining the planned expenditure for September. The processor 110 according to various embodiments may calculate and display an amount estimated to be additionally expendable, based on the determined monthly income and expenditure.

Figure 10A:
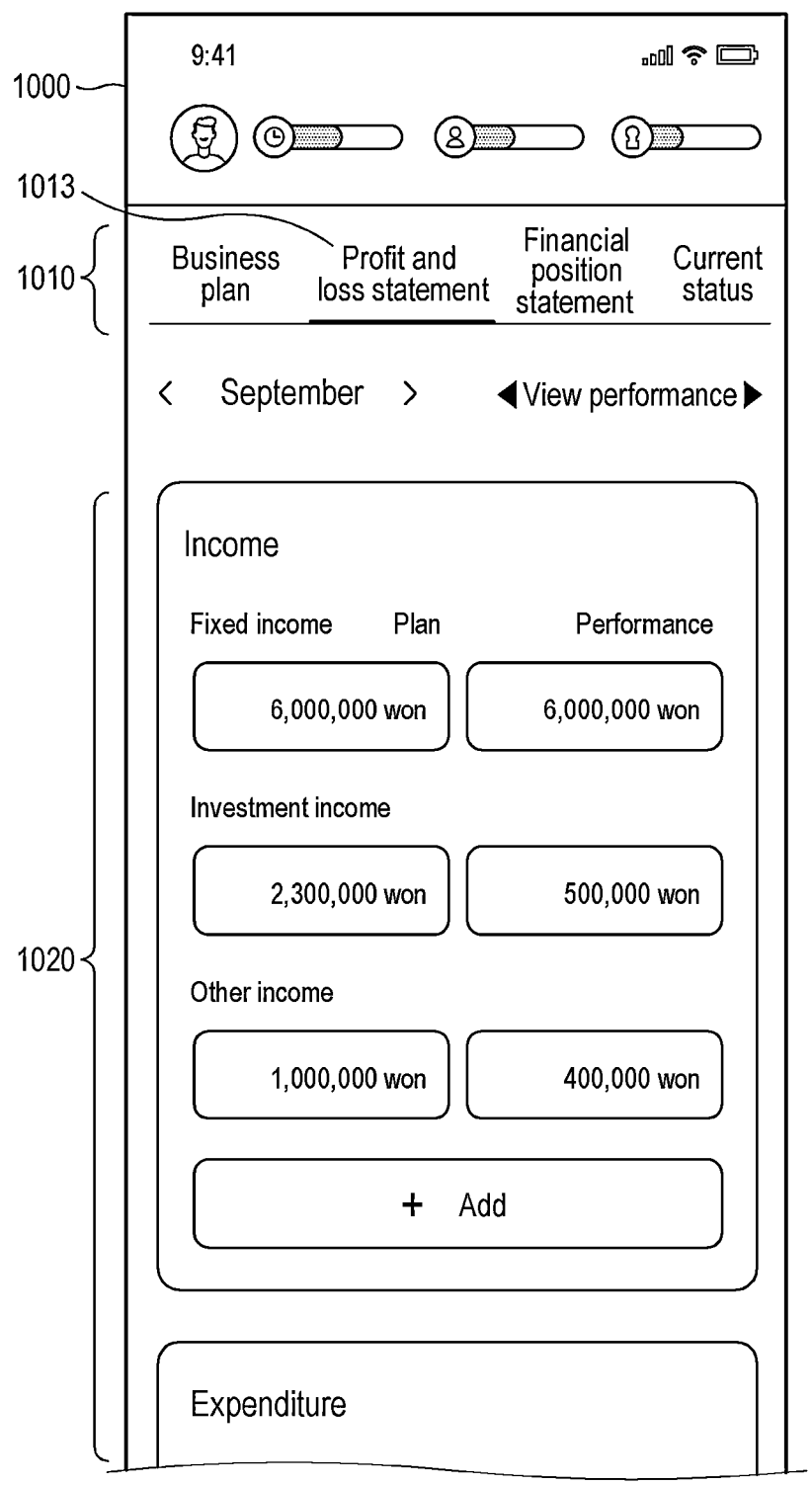
Figure 10C:
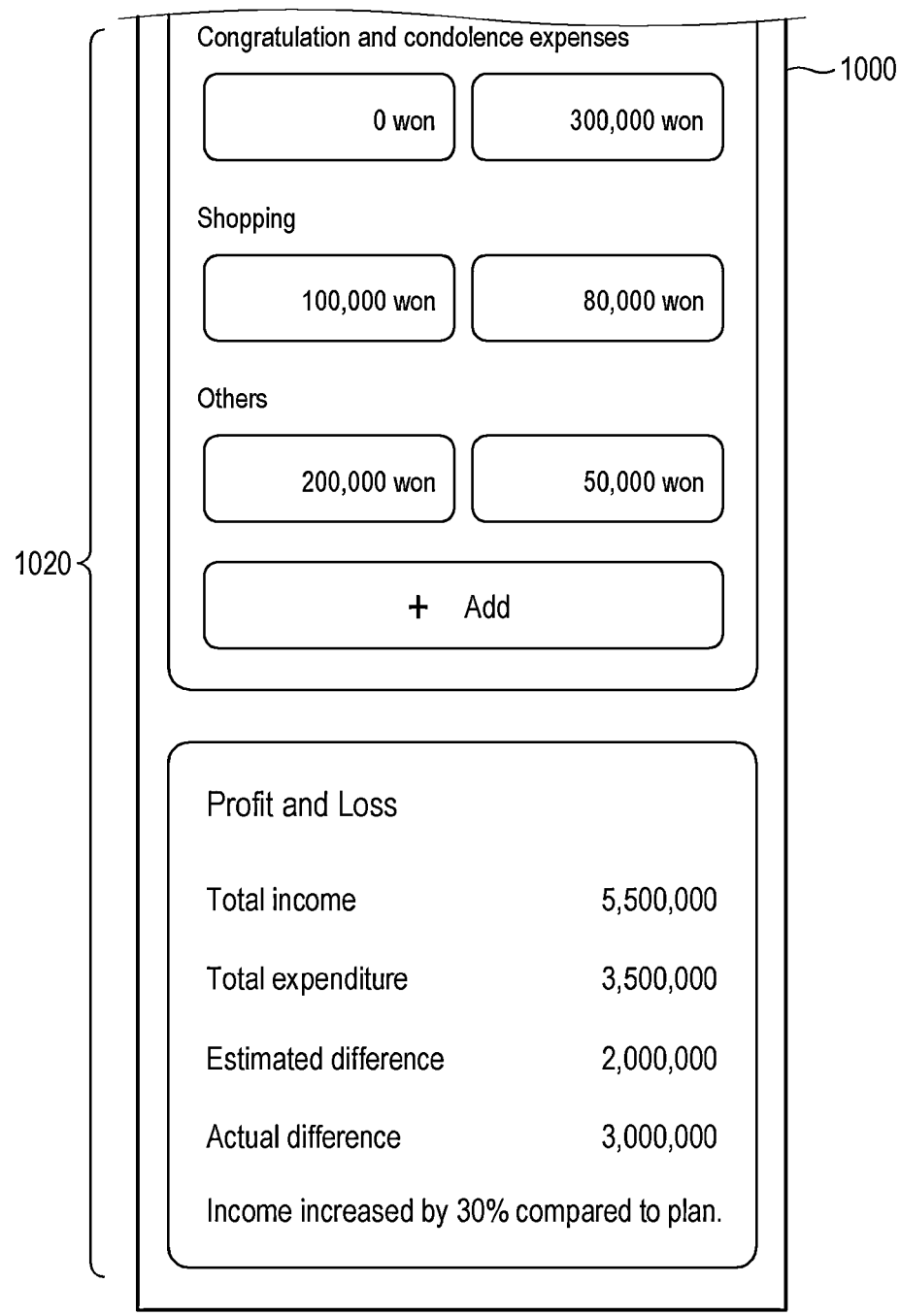
Figure 11:
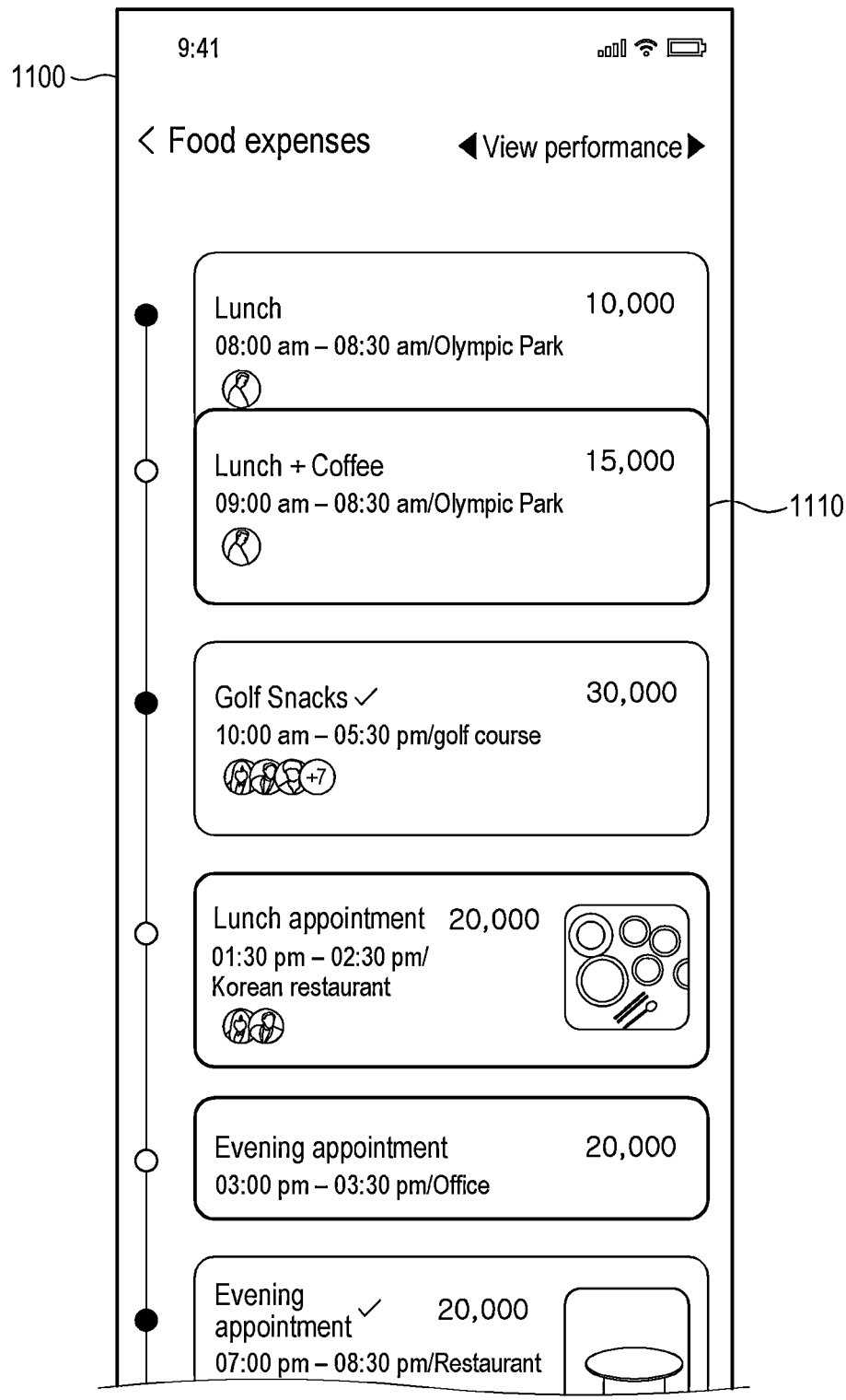
FIG. 11 illustrates a profit and loss statement detail screen according to various embodiments of the present disclosure.
Figure 12A:
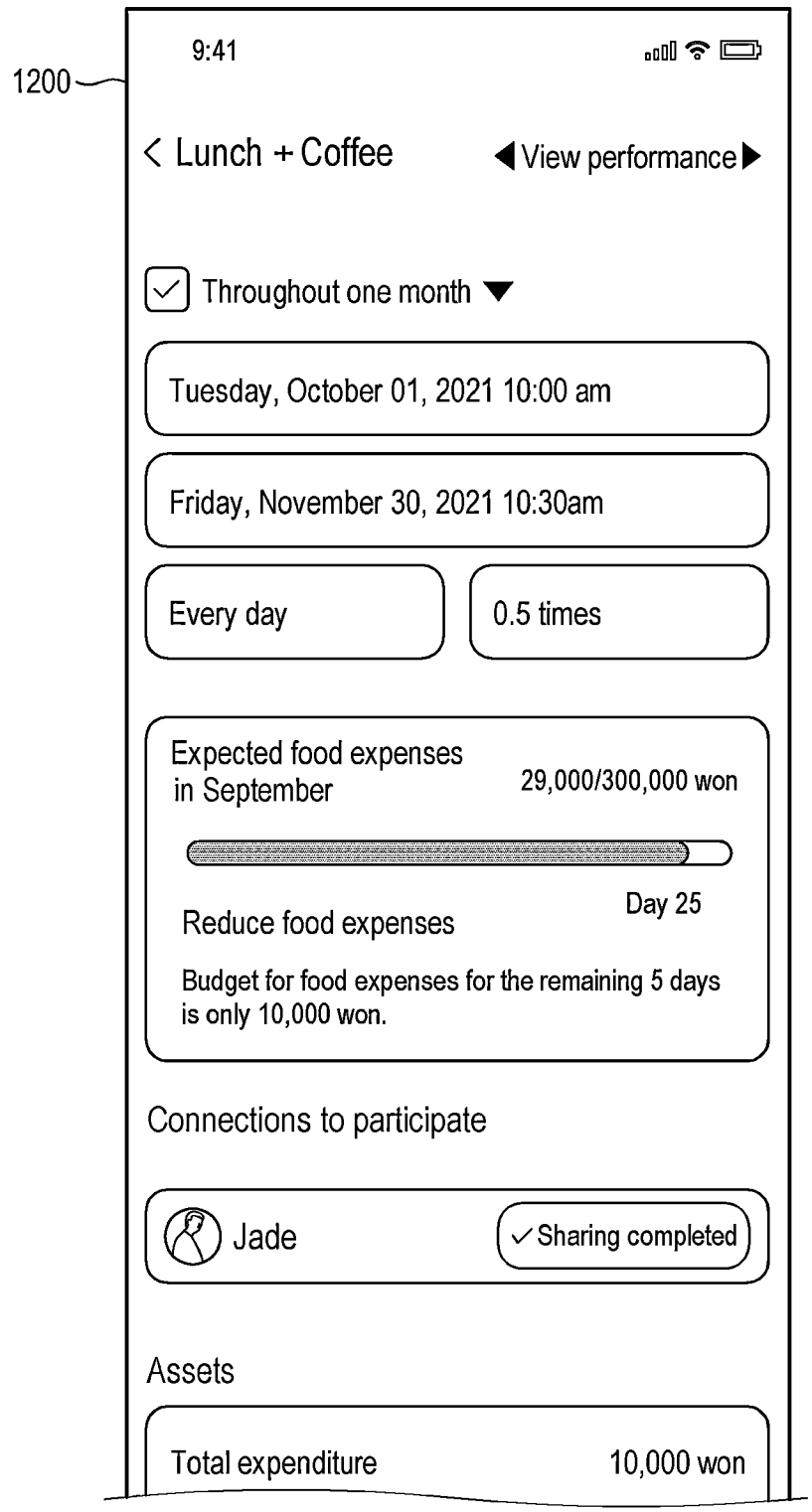
FIGS. 12A and 12B illustrate a conduct detail screen according to various embodiments.
Figure 12B:
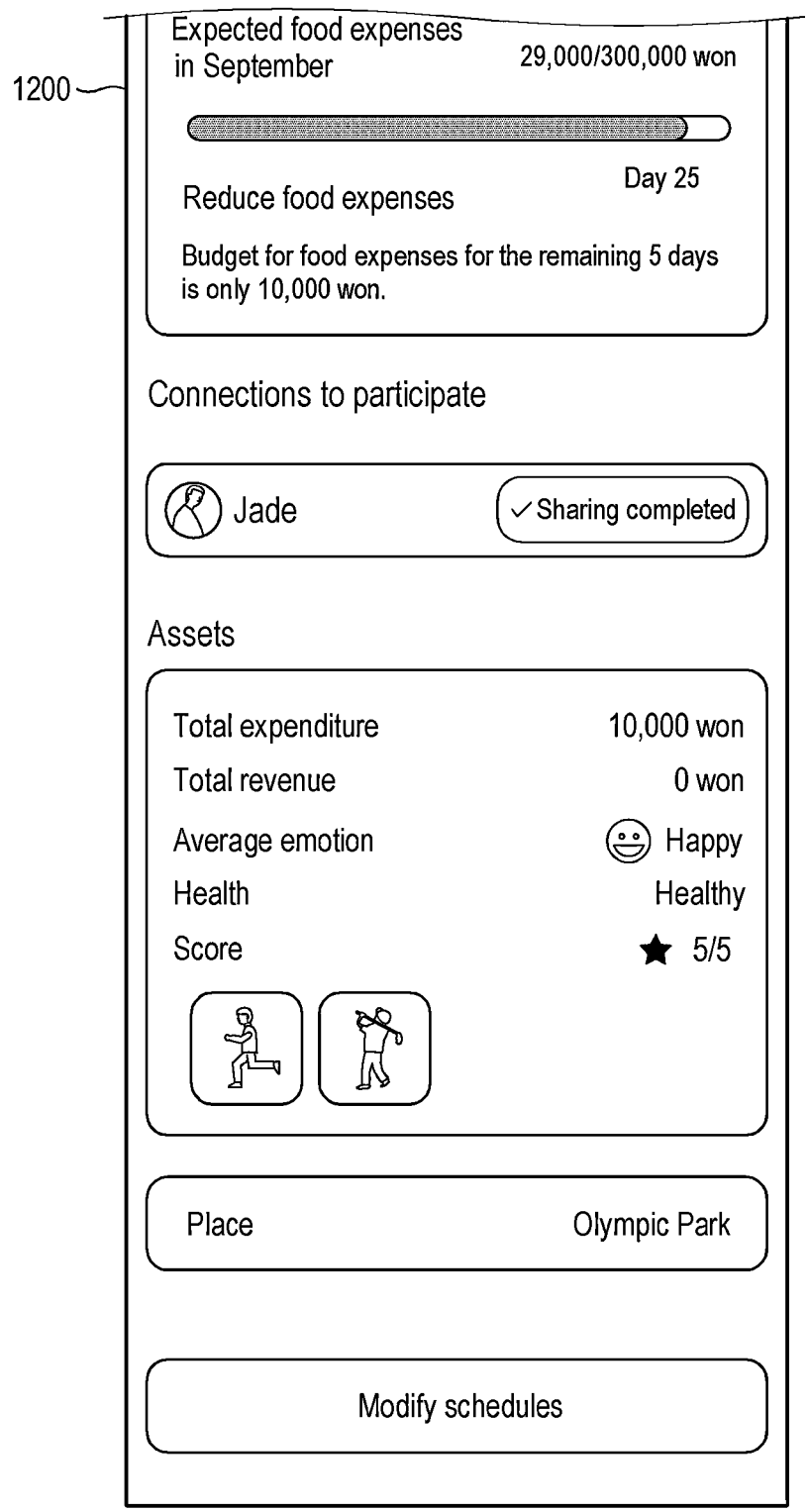

FIGS. 10A, 10B, and 10C illustrate a profit and loss statement display screen 1000 among asset management according to various embodiments of the present disclosure. FIGS. 11, 12A, and 12B illustrate a profit and loss statement detail screen 1100, 1200 according to various embodiments of the present disclosure.

Referring to FIGS. 10A to 10C, the processor 110 according to various embodiments may display the profit and loss statement display screen 1000 including an asset management tab area 1010 and a profit and loss statement display area 1020. The user may select a profit and loss statement tab 1013 of the asset management tab area 1010 to determine the profit and loss statement display screen 1000.

The processor 110 according to various embodiments may generate a profit and loss statement based on planned income and expenditure and actual income and expenditure. The processor 110 may generate a monthly profit and loss statement. For example, when September investment income has been planned to be 2,300,000 won but actual September investment income is 500,000 won, the processor 110 may display the profit and loss statement as shown in the profit and loss statement display area 1020 in FIG. 10A. In the same way, each item of income and expenditure may be calculated. The user's income and expenditure details may include income and expenditure information registered with respect to a plurality of conducts. For example, when income details are registered with respect to a specific conduct of the user, the processor 110 may reflect the registered income details to information about a deposit among the user's income. For example, when expenditure details are registered in relation to the specific conduct, the processor 110 may reflect the registered expenditure details to the information about the user's deposit.

The processor 110 according to various embodiments may calculate a total income based on actual income stored in the plurality of conducts, may calculate total expenditure based on actual expenditure, may calculate the expected difference between planned income and planned expenditure, and may calculate the actual difference between the actual income and the actual expenditure. The processor 110 may display the calculations in the profit and loss statement display area 1020.

FIG. 11 illustrates a profit and loss statement detail screen 1100 according to various embodiments of the present disclosure. When the user is curious about the details of the profit and loss statement shown in FIGS. 10A to 10C, the user may select a desired item to check the profit and loss statement detail screen 1100. FIG. 11 is the profit and loss statement detail screen 1100 displaying the details of food expenses. Of course, details other than the food expense details may be selected and displayed.

The processor 110 according to various embodiments may display a conduct list including at least one conduct related to food expenses. The at least one conduct may include a conduct in which food expenses are to be spent and a conduct in which food expenses are actually spent. Thus, the user may compare the planned food expenses with the actually paid food expenses at a glance.

The user may select a specific conduct from the displayed conduct list to additionally determine details of the specific conduct. In response to receiving a user input for selecting a conduct 1110 related to "lunch+coffee," the processor 110 may display a detailed screen regarding the conduct 1110.

FIGS. 12A and 12B illustrate a detailed screen 1200 of a conduct according to various embodiments. When a user input for selecting the conduct 1110 relating to "lunch+coffee" in FIG. 11 is received, the processor 110 may display the detailed screen 1200 of the conduct 1110. The configuration of the detailed screen 1200 is the same as the configuration described with reference to FIGS. 5E, 5F, and 5G, and thus a detailed description thereof will be omitted.

Figure 13A:
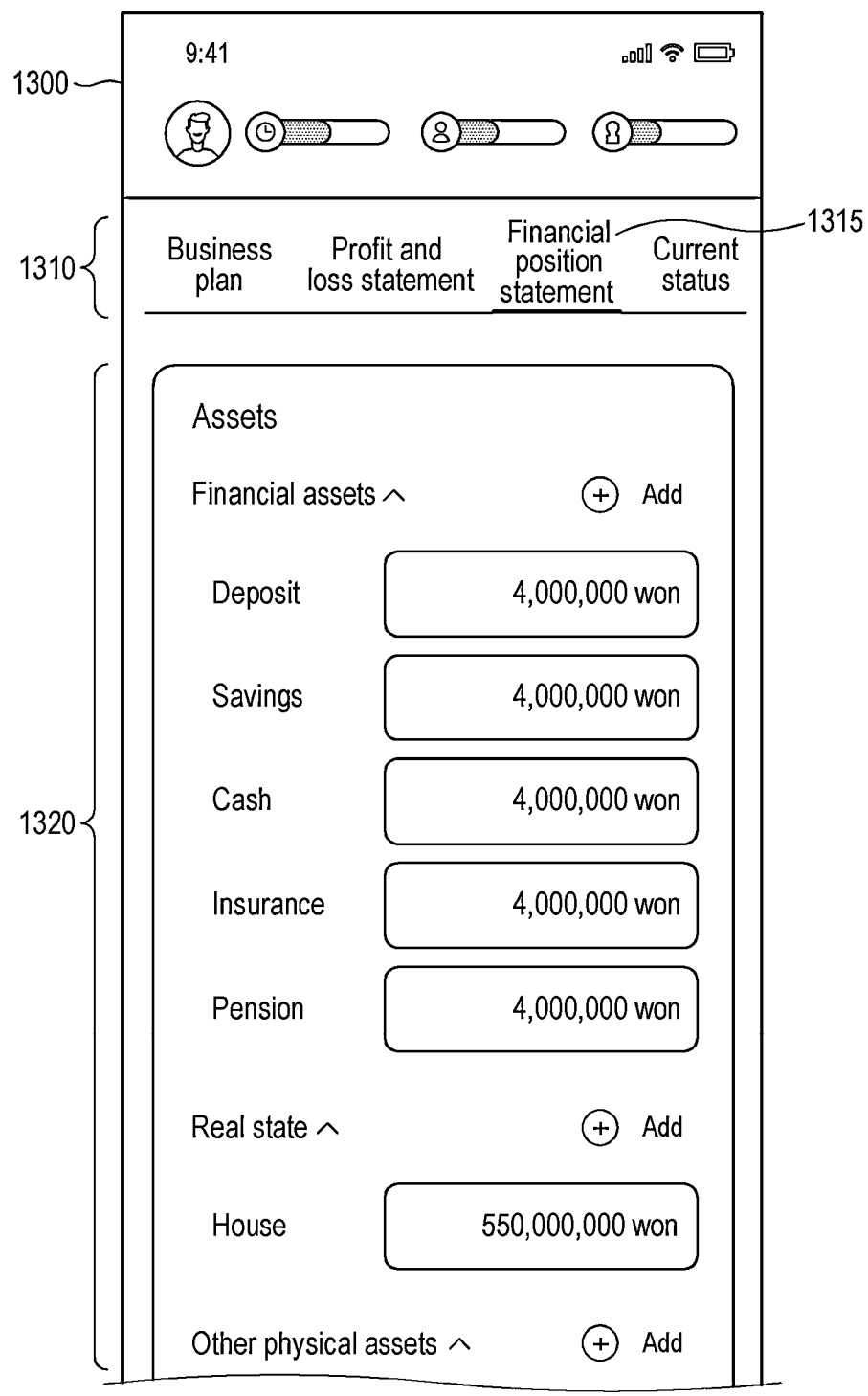
FIGS. 13A, 13B, and 13C illustrate a financial position statement screen among asset management screens according to various embodiments of the present disclosure.
Figure 13B:
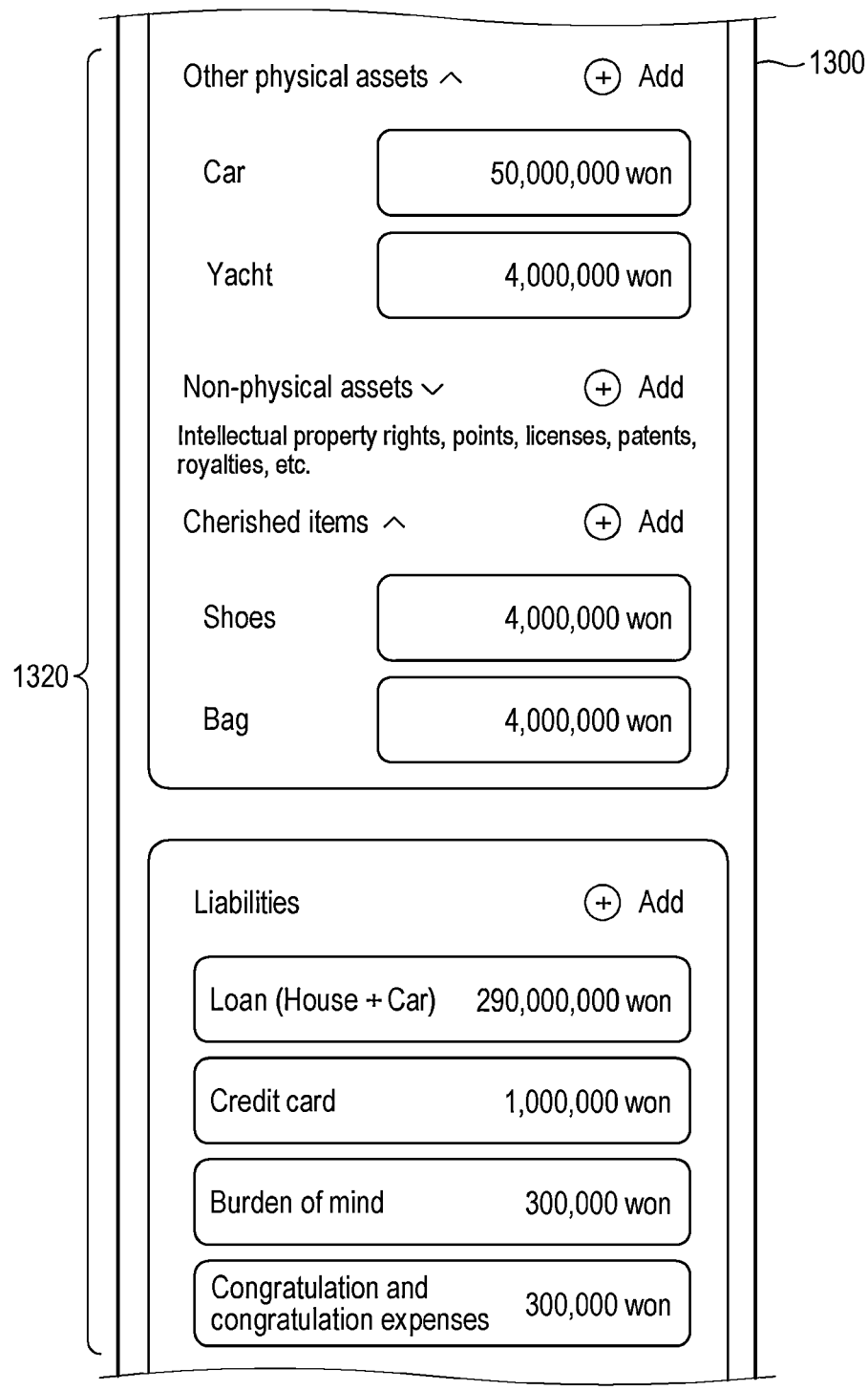
Figure 13C:
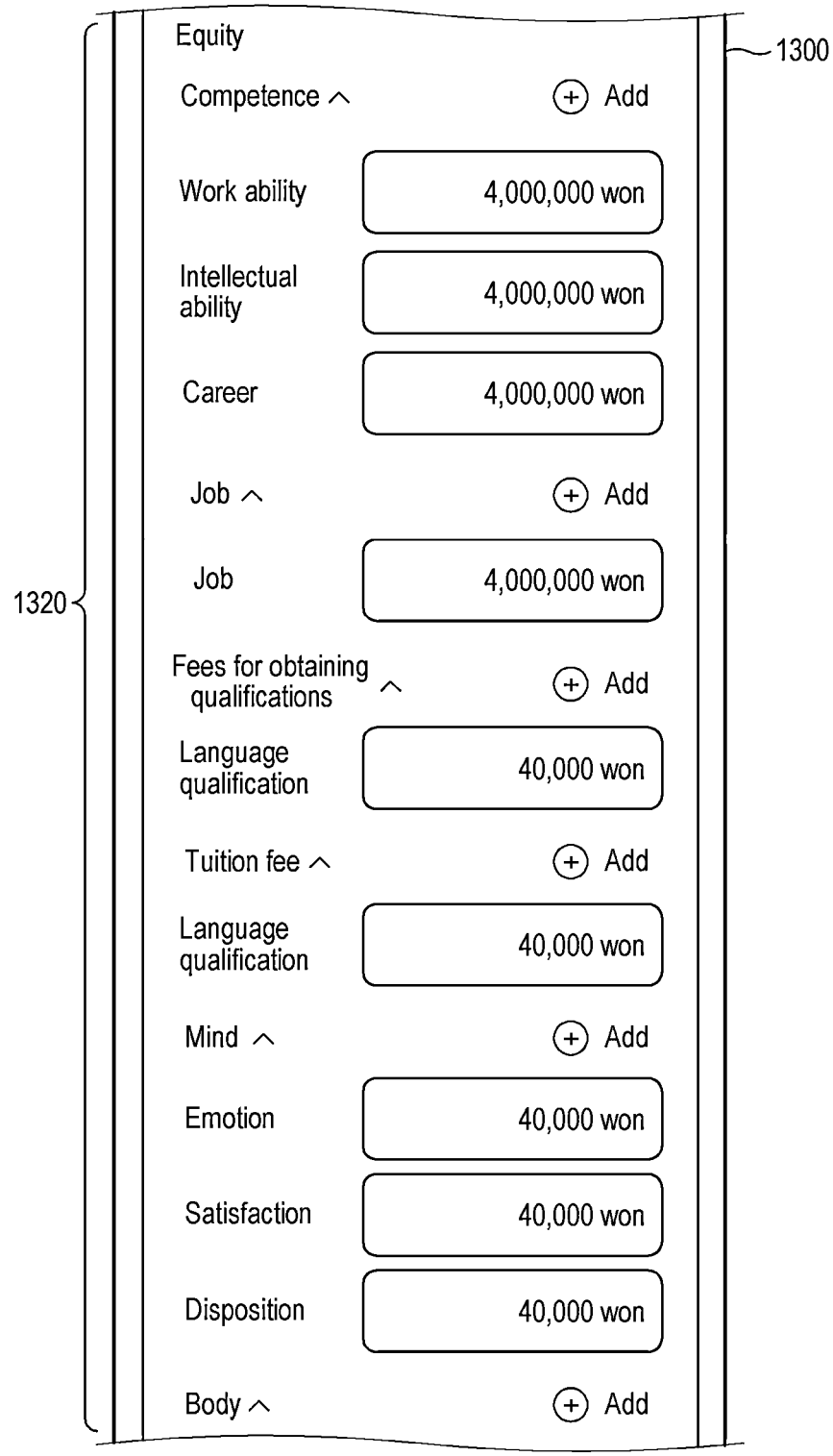

FIGS. 13A, 13B, and 13C illustrate a financial position statement screen 1300 among asset management screens according to various embodiments of the present disclosure.

The processor 110 according to various embodiments may display a financial position statement screen 1300 including an asset management tab area 1310 and a financial position statement display area 1320. The processor 110 may display the financial position statement screen 1300, in response to a user input for selecting a financial position statement tab 1315 of the asset management tab area 1310.

The financial position statement display area 1320 according to various embodiments may include information on assets, liabilities, and equity. The processor 110 may generate a statement of financial position, based on information about the user's assets, liabilities, and equity stored in a plurality of conducts. The processor 110 may generate a monthly statement of financial position.

Asset information of the user may include, for example, an asset amount. The asset information of the user may include asset information registered with respect to a plurality of conducts of the user. The processor 110 may classify and display the asset information of the user by asset type. The processor 110 may display the asset information classified by asset type in different areas within the financial position state display area 1320. The processor 110 may further display a total asset amount of each piece of the user's asset information in the financial position state display area 1320.

Assets include financial assets (e.g., deposits, savings, cash, insurance, and pensions), real estate assets (e.g., houses), physical assets (e.g., cars and yachts), non-physical assets (e.g., licenses and intellectual property rights), and cherished items (e.g., shoes, bags). Liabilities may include loans, credit cards, debts of the mind, and expenditure for congratulations and condolences. Equity may include equity regarding competence (e.g., work ability, intellectual ability, career), occupation, fees for obtaining qualifications (e.g., language qualifications), tuition fees (e.g., language qualifications), mind (e.g., emotion, satisfaction, and disposition), and body (e.g., blood pressure, weight, health check-up). The user may directly add assets, liabilities, and equity in the statement of financial position.

Figure 14A:
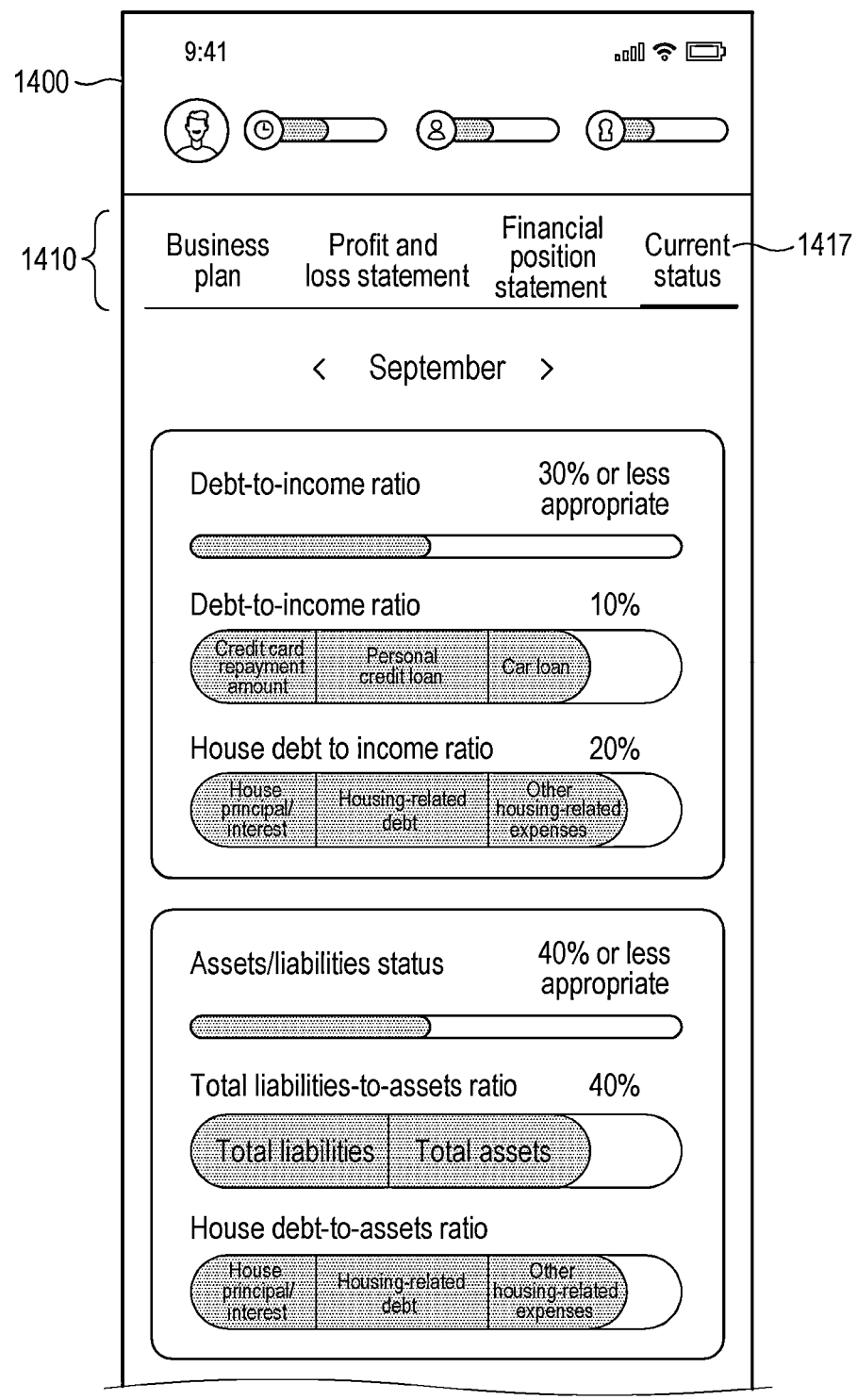
FIGS. 14A and 14B illustrate a current status screen among asset management screens according to various embodiments of the present disclosure.
Figure 14B:
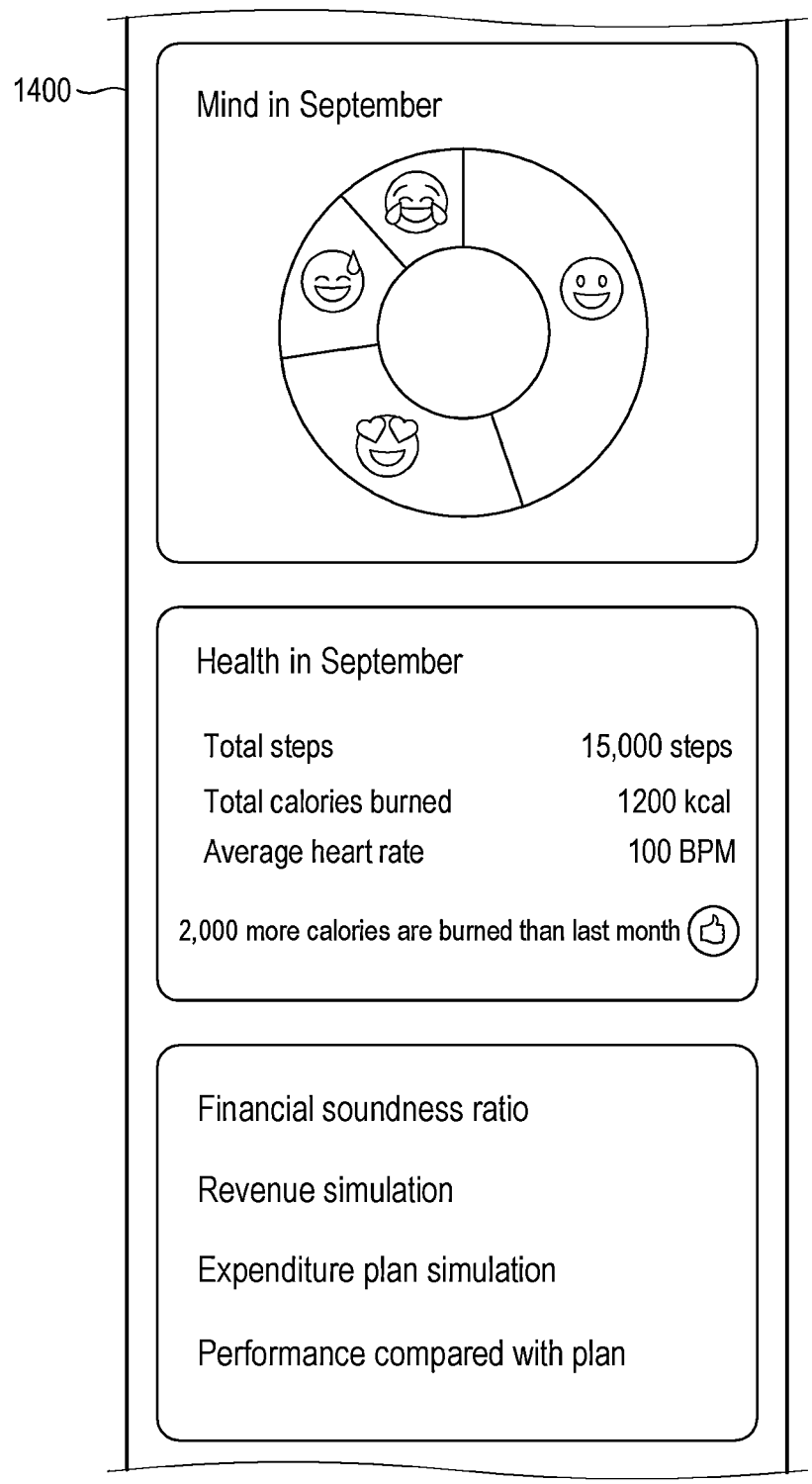
Figure 15A:
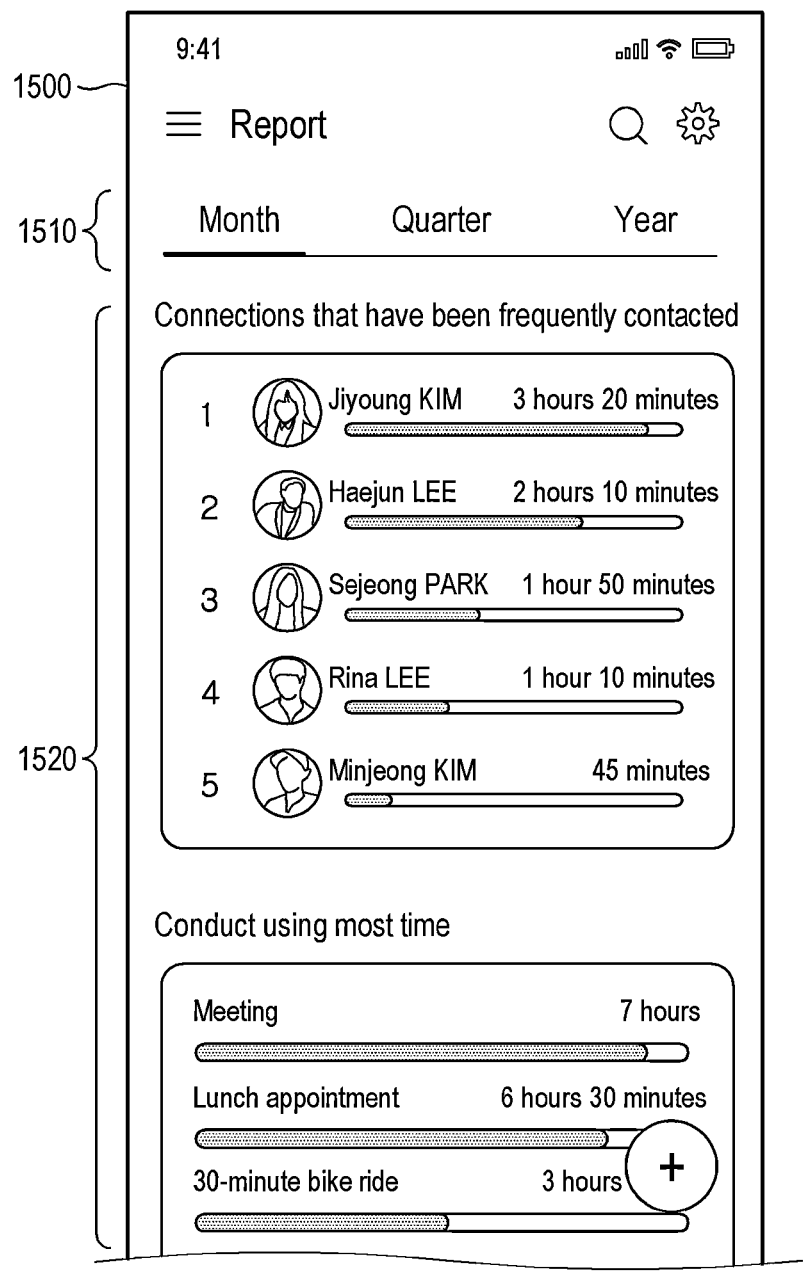
FIGS. 15A, 15B, 15C, and 15D illustrate a report management screen of an application according to various embodiments of the present disclosure.
Figure 15B:
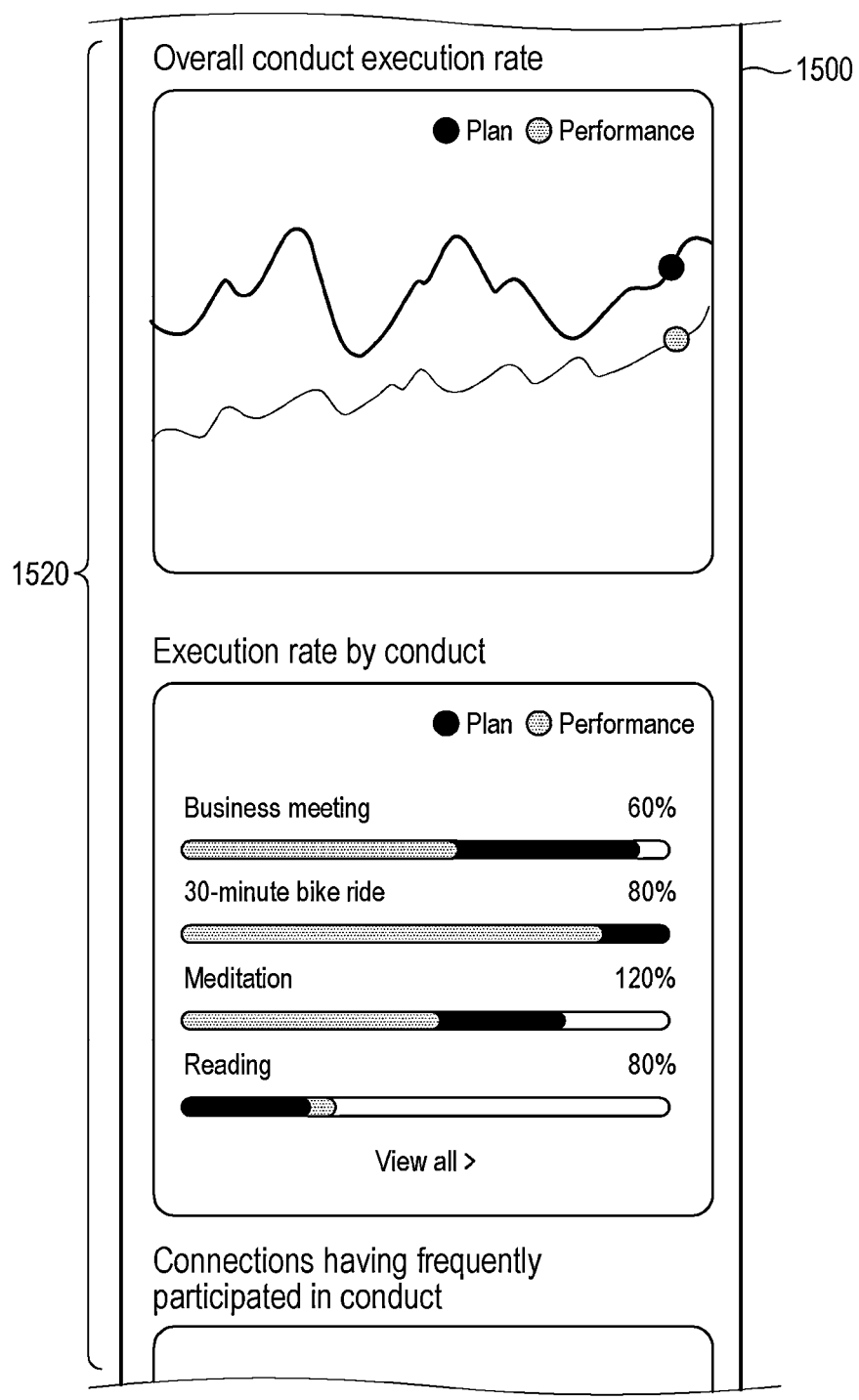
Figure 15C:
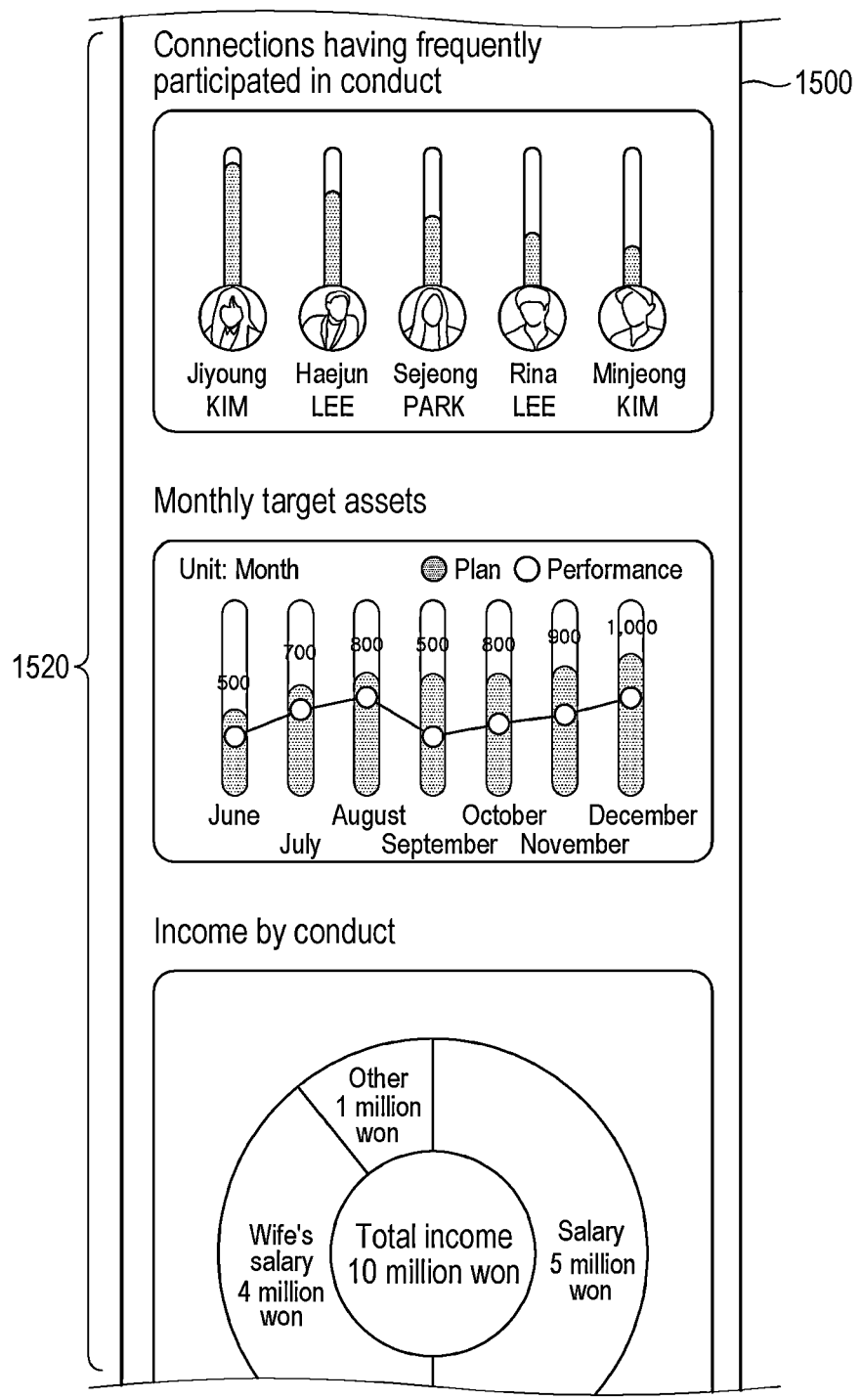
Figure 15D:
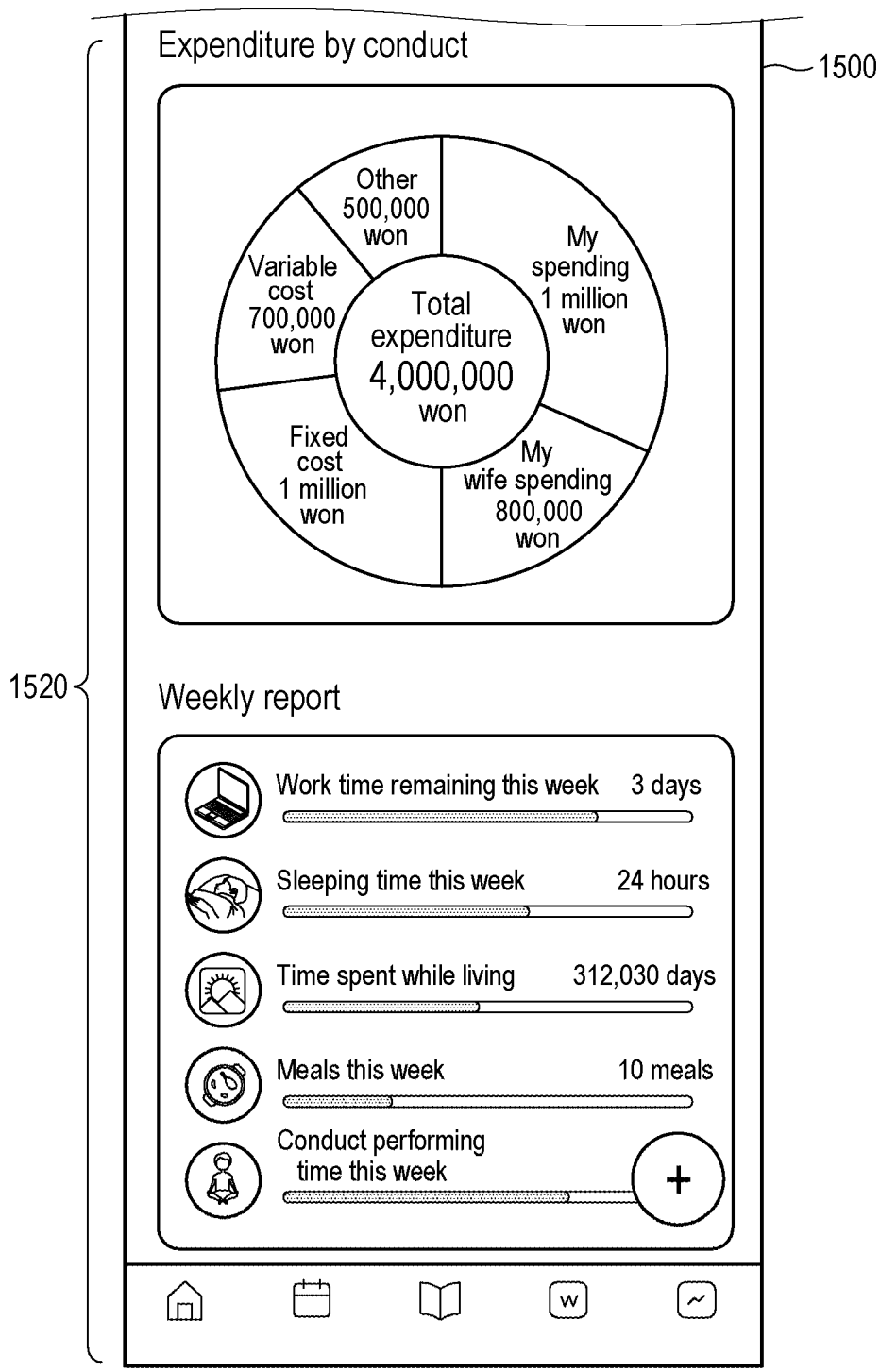

FIGS. 14A and 14B illustrate a current status screen 1400 among asset management screens according to various embodiments of the present disclosure. The current status screen 1400 may be displayed by selecting a current status tab 1417 of an asset management tab area 1410. The current status screen 1400 may include a debt-to-income ratio, an assets-liabilities status, mind statistics, health statistics, and other statistics.

The debt-to-income ratio is a value generated based on current income and debt, and the debt-to-income ratio may further include a consumption debt-to-income ratio and a house debt-to-income ratio. The above-mentioned debt ratio may be calculated in the form of %. The assets-liabilities status may include an assets-liabilities ratio generated based on current assets and liabilities, and the assets-liabilities status may further include a ratio of total liabilities to assets and a ratio of house debt to assets.

The mind statistics may refer to statistics of emotional states obtained by evaluating a plurality of conducts. The mind statistics may be displayed in the form of a graph including a ratio for each emotion. The health statistics may include total steps, total calories burned, and an average heart rate. The health statistics may further include the result of comparison with statistical values of other months. Other statistics may further include a financial soundness ratio, revenue simulation, expenditure plan simulation, and performance compared with a plan.

FIGS. 15A, 15B, 15C, and 15D illustrate a report management screen 1500 of an application according to various embodiments of the present disclosure. The processor 110 may display the report management screen 1500 in response to a user input for selecting the report management icon 339 of the function selection area 330 in FIG. 3A. The processor 110 may display the report management screen 1500 including various pieces of information about an application usage log of the application during a preset period (e.g., one month).

The report management screen 1500 according to various embodiments may include a period setting area 1510 and a report display area 1520. The report display area 1520 may include information about connections that are frequently contacted, information on a conduct which has used the most time, information about an overall conduct execution rate, information about an execution rate for each conduct, information about connections that have frequently participated in a conduct, information about monthly target assets, information about income for each conduct, or information about expenditure for each conduct.

The information about connections that are frequently contacted may be information including the number of people (e.g., five people) designated in the order of making a lot of calls among the information about a plurality of connections. The information on a conduct which has used the most time may be information including a number (e.g., three) of conducts designated in the order of the actual time spent among a plurality of conducts.

The information about an overall conduct execution rate may be graph information indicating a ratio of a planned conduct and an actually performed conduct among a plurality of conducts. The information about an overall conduct execution rate may be a graph displaying a monthly conduct execution rate. The information about an execution rate for each conduct may be information indicating a plan and performance ratio of each of a plurality of conducts.

The information about connections that have frequently participated in a conduct may be information that displays connections by a preset number (e.g., 5 people) in the order of most frequent participation, based on information on connections that have participated in a plurality of conducts. Each piece of the information about connections that have frequently participated in a conduct may further include a conduct execution rate for each of connections.

The information about monthly target assets may be a graph comparing monthly planned assets and performance assets. The information about income for each conduct may be a graph displaying income for each item, based on a plurality of conducts. The information about expenditure for each conduct may be a graph displaying expenditure for each item, based on a plurality of conducts. The weekly report may be information obtained by calculating various statistical information generated based on a plurality of conducts (e.g., remaining working hours this week, sleeping time this week, living time, number of meals this week, and conduct performance time this week).

The electronic device according to various embodiments of the present disclosure may efficiently manage the various personal resources by combining and managing personal information, schedule information, connections information, and asset information together to comprehensively manage the various personal resources.

While the foregoing methods have been described with respect to particular embodiments, these methods may also be implemented as computer-readable code on a computer-readable recording medium. The computer-readable recording medium includes any kind of data storage devices that can be read by a computer system. Examples of the computer-readable recording medium includes ROM, RAM, CD-ROM, magnetic tape, floppy disk, optical data storage device, and the like. Also, the computer-readable recording medium can be distributed to computer systems which are connected through a network so that the computer-readable code can be stored and executed in a distributed manner. Further, the functional programs, code, and code segments for implementing the foregoing embodiments can easily be inferred by programmers in the art to which the present disclosure pertains.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An electronic device comprising:
a display;
a storage configured to store personal information of a user, information about a plurality of schedules of the user, information about a plurality of contacts, and asset information of the user; and
a processor,
wherein the processor is configured to:
display, on the display, a home screen of an application for personal resource management;
display a schedule management screen comprising the information about the plurality of schedules of the user on the display, in response to a first user input for selecting a schedule management icon on the home screen;
display a connections management screen comprising the information about the plurality of contacts on the display, in response to a second user input for selecting a connections management icon on the home screen;

display an asset management screen comprising the asset information of the user on the display, in response to a third user input for selecting an asset management icon on the home screen;

display a report management screen comprising information about a usage log of the application during a preset period on the display, in response to a fourth user input for selecting a report management icon on the home screen;

generate, based on the information about the plurality of schedules, a time status bar indicating a degree to which the user uses time;

generate, based on the information about the plurality of contacts, a connections status bar indicating a degree to which the user uses connections;

generate, based on the asset information of the user, an asset status bar indicating a degree to which the user uses assets; and display the time status bar, the connections status bar, and the asset status bar in one area of the home screen.

2. The electronic device of claim 1, wherein the schedule management screen comprises information about at least one schedule that has been completed among the information about the plurality of schedules.

3. The electronic device claim 2, wherein the processor is configured to display, in response to a fifth user input for selecting information about one schedule from the information about the plurality of schedules of the user included in the schedule management screen, a detailed schedule screen comprising details information, income and expenditure information, and photo and music information registered with respect to the selected information on the display.

4. The electronic device of claim 1, wherein the processor is configured to display an activity generation screen for generating new activity information on the display, in response to a sixth user input for selecting an activity addition icon included in the schedule management screen, and wherein the activity information comprises schedule information, place information, asset information, and rating information.

5. The electronic device of claim 1, wherein the processor is configured to:

receive a seventh user input for selecting one contact from among the plurality of contacts included in the connections management screen; and display profile information, call log information, and activity information related to the selected contact on the display, based on the seventh user input, and wherein the activity information related to the selected contact comprises an activity name, schedule information, place information, asset information, and rating information, which are related to the selected contact.

6. The electronic device of claim 1, wherein the asset information of the user is classified into a financial asset, a real estate asset, a physical asset, a non-physical asset, a cherished item, income details, and expenditure details, and wherein the processor is configured to display each piece of the classified asset information of the user in different areas of the asset management screen.

7. The electronic device of claim 6, wherein the processor is configured to:

generate a monthly profit and loss statement based on the asset information of the user; and display the generated monthly profit and loss statement in one area of the asset management screen, in response to an eighth input for selecting a profit and loss statement tab included in the asset management screen.

8. The electronic device of claim 7, wherein the processor is configured to:

generate a monthly statement of financial position, based on the asset information of the user; and display the generated monthly statement of financial position in one area of the asset management screen, in response to a ninth user input for selecting a financial position statement tab included in the asset management screen.

9. A method for managing a personal resource by using an electronic device, the method comprising:

displaying, on a display, a home screen of an application for personal resource management;

displaying a schedule management screen comprising information about a plurality of schedules of a user stored in a storage on the display, in response to a first user input for selecting a schedule management icon on the home screen;

displaying a connections management screen comprising information about a plurality of contacts stored in the storage on the display, in response to a second user input for selecting a connections management icon on the home screen;

displaying an asset management screen comprising asset information of the user stored in the storage on the display, in response to a third user input for selecting an asset management icon on the home screen;

displaying a report management screen comprising information about a usage log of the application during a preset period on the display, in response to a fourth user input for selecting a report management icon on the home screen;

generating, based on the information about the plurality of schedules, a time status bar indicating a degree to which the user uses time;

generating, based on the information about the plurality of contacts, a connections status bar indicating a degree to which the user uses connections;

generating, based on the asset information of the user, an asset status bar indicating a degree to which the user uses assets; and displaying the time status bar, the connections status bar, and the asset status bar in one area of the home screen.

10. The method of claim 9, wherein the schedule management screen comprises information about at least one schedule that has been completed among the information about the plurality of schedules.

11. The method of claim 10, further comprising displaying, in response to a fifth user input for selecting information about one schedule from the information about the plurality of schedules of the user included in the schedule management screen, a detailed schedule screen comprising details information, income and expenditure information, and photo and music information registered with respect to the selected information on the display after the displaying of the schedule management screen on the display.

12. The method of claim 9, further comprising displaying, after the displaying of the schedule management screen on the display, an activity generation screen for generating new activity information on the display, based on a sixth user input for selecting an activity addition icon included in the schedule management screen, wherein the activity information comprises schedule information, place information, asset information, and rating information.

13. The method of claim 9, further comprising:
after the displaying of the connections management screen on the display, receiving a seventh user input for selecting one contact from among the plurality of contacts included in the connections management screen; and
displaying profile information, call log information, and activity information related to the selected contact on the display, based on the seventh user input,
wherein the activity information related to the selected contact comprises an activity name, schedule information, place information, asset information, and rating information, which are related to the selected contact.

14. The method of claim 9, wherein the asset information of the user is classified into a financial asset, a real estate asset, a physical asset, a non-physical asset, a cherished item, income details, and expenditure details, and
wherein the displaying of the asset management screen comprises displaying each piece of the classified asset information of the user in different areas of the asset management screen.

15. The method of claim 14, further comprising:
generating a monthly profit and loss statement based on the asset information of the user; and
displaying the generated monthly profit and loss statement in one area of the asset management screen, in response to an eighth input for selecting a profit and loss statement tab included in the asset management screen.

16. The method of claim 15, further comprising:
generating a monthly statement of financial position, based on the asset information of the user; and
displaying the generated monthly statement of financial position in one area of the asset management screen, in response to a ninth user input for selecting a financial position statement tab included in the asset management screen.

17. A non-transitory computer-readable recording medium recording a program to be performed on a computer, wherein the program comprises executable commands which, when executed by a processor, cause the processor to:
display, on the display, a home screen of an application for personal resource management;
display a schedule management screen comprising information about a plurality of schedules of a user stored in a storage on the display, based on a first user input for selecting a schedule management icon on the home screen;
display a connections management screen comprising information about a plurality of contacts stored in the storage on the display, based on a second user input for selecting a connections management icon on the home screen;
display an asset management screen comprising asset information of the user stored in the storage on the display, based on a third user input for selecting an asset management icon on the home screen;
display a report management screen comprising information about a usage log of the application during a preset period on the display, based on a fourth user input for selecting a report management icon on the home screen;
generate, based on the information about the plurality of schedules, a time status bar indicating a degree to which the user uses time;
generate, based on the information about the plurality of contacts, a connections status bar indicating a degree to which the user uses connections;
generate, based on the asset information of the user, an asset status bar indicating a degree to which the user uses assets; and
display the time status bar, the connections status bar, and the asset status bar in one area of the home screen.

* * * * *